United States Patent
Sato et al.

(10) Patent No.: US 7,873,875 B2
(45) Date of Patent: Jan. 18, 2011

(54) DEBUGGING SYSTEM, DEBUGGING CIRCUIT AND INFORMATION PROCESSING APPARATUS

(75) Inventors: Takashi Sato, Kawasaki (JP); Atsushi Fujita, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 579 days.

(21) Appl. No.: 11/878,780

(22) Filed: Jul. 26, 2007

(65) Prior Publication Data
US 2008/0059843 A1  Mar. 6, 2008

(30) Foreign Application Priority Data
Sep. 5, 2006  (JP) ............... 2006-240079

(51) Int. Cl.
*G06F 11/00*  (2006.01)
(52) U.S. Cl. .......................... 714/45; 714/42
(58) Field of Classification Search .............. 714/45, 714/42, 47, 54, 44; 711/112; 712/227
See application file for complete search history.

(56) References Cited

U.S. PATENT DOCUMENTS

| | | | |
|---|---|---|---|
| 6,438,715 B1* | 8/2002 | Assouad | 714/45 |
| 6,745,351 B1* | 6/2004 | Mastro | 714/57 |
| 2003/0061550 A1* | 3/2003 | Ng et al. | 714/45 |
| 2004/0064763 A1* | 4/2004 | Swoboda | 714/45 |
| 2005/0268177 A1* | 12/2005 | John | 714/47 |
| 2007/0220360 A1* | 9/2007 | Weinert et al. | 714/45 |
| 2007/0260435 A1* | 11/2007 | Matsunaga et al. | 703/2 |

FOREIGN PATENT DOCUMENTS

| | | |
|---|---|---|
| JP | 2004-038981 | 2/2004 |
| JP | 2004-178591 | 6/2004 |

* cited by examiner

*Primary Examiner*—Dieu-Minh Le
(74) *Attorney, Agent, or Firm*—Fujitsu Patent Center

(57) ABSTRACT

A debugging system includes a CPU that is a debugging target and a debugging circuit. The CPU has an output part configured to independently output stack access information of a stack access and data access information of a data access excluding the stack access, as data access information of the CPU that is monitored by the debugging circuit. The debugging circuit has a trace part configured to independently generate and output trace information of the stack access from the stack access information that is output from the CPU and trace information of the data access excluding the stack access from the data access information that is output from the CPU.

20 Claims, 25 Drawing Sheets

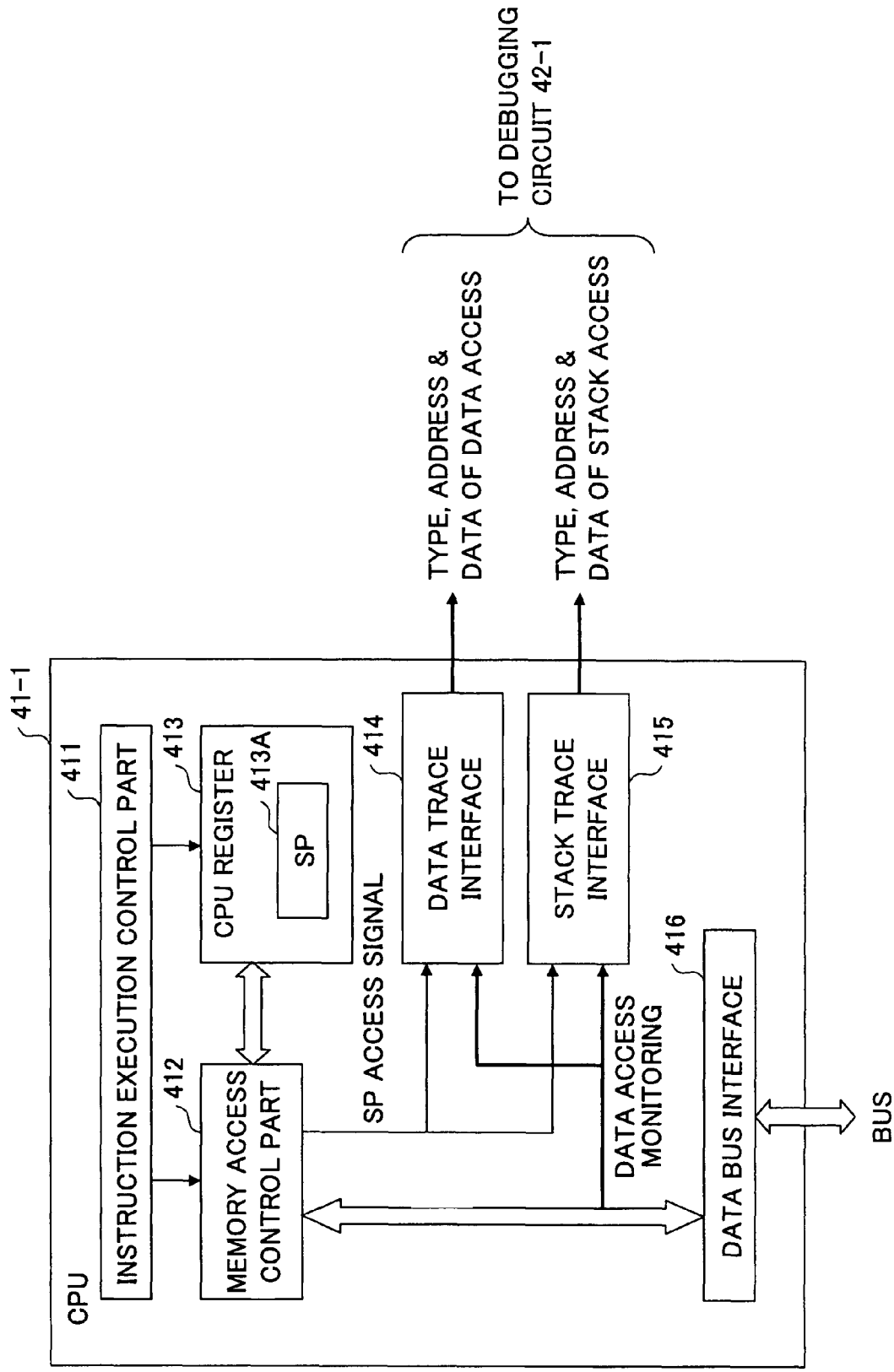

FIG.11A

| DATA TRACE ID (1 bit) | READ OR WRITE (1 bit) | SIZE (2 bits) | ADDRESS (32 bits) | DATA (8, 16 or 32 bits) |

FIG.11B

| DATA TRACE ID (1 bit) | READ OR WRITE (1 bit) | ADDRESS (32 bits) | DATA (32 bits) |

FIG.11C

| DATA TRACE ID (1 bit) | CONTENTS |
| --- | --- |
| 0b0 | NORMAL DATA ACCESS TRACE |
| 0b1 | STACK ACCESS TRACE |

FIG.18A

| DATA TRACE ID (1 bit) | READ OR WRITE (1 bit) | SIZE (2 bits) | ADDRESS (32 bits) | DATA (8, 16 or 32 bits) |

FIG.18B

| DATA TRACE ID (1 bit) | STACK ID (1 bit) | READ OR WRITE (1 bit) | ADDRESS (32 bits) | DATA (32 bits) |

FIG.18C

| STACK ID | CORRESPONDING SP |
|---|---|
| 0b0 | USER STACK POINTER (USP) |
| 0b1 | SYSTEM STACK POINTER (SSP) |

FIG.21A

| DATA TRACE ID (0b1) | STACK ACCESS INFO (2 bits) | STACK ACCESS DATA (32 bits) |
|---|---|---|

FIG.21B

| DATA TRACE ID (0b1) | STACK ACCESS INFO (2 bits) | STACK ACCESS ADDED INFO (5 bits) | STACK ACCESS DATA (32 bits) |
|---|---|---|---|

FIG.21C

| STACK ACCESS INFO | STACK ACCESS CONTENTS | STACK ACCESS DATA CONTENTS |
|---|---|---|
| 0b00 | PUSH ACCESS | PUSHED DATA VALUE |
| 0b01 | POP ACCESS | POPPED DATA VALUE |
| 0b10 | SP RELATIVE ACCESS | DATA VALUE OF SP RELATIVE ACCESS |
| 0b11 | SP REWRITE | NEW SP VALUE |

FIG.21D

| STACK ACCESS ADDED INFO | CONTENTS |
|---|---|
| bit4 | TYPE OF SP RELATIVE ACCESS (0b0: READ, 0b1: WRITE) |
| bit3-0 | OFFSET VALUE (TWO'S COMPLIMENT REPRESENTATION) WITH RESPECT TO SP VALUE NOTE: FORMED BY UPPER 4 BITS OF 6-BIT OFFSET VALUE, LOWER 2 BITS FOR DATA ALIGNMENT OMITTED |

FIG.22A  | 0b1 | 0b11 | 0x00004000 |
FIG.22B  TRACING SP 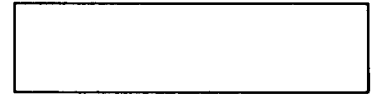
FIG.22C  TRACING SP   0x00004000
FIG.22D  NO EVENT FIG.23A  | 0b1 | 0b00 | 0x01234567 |

FIG.23B  TRACING SP  | 0x00004000 |

FIG.23C  TRACING SP  | 0x00003FFC |

FIG.23D  WRITE 0x01234567 TO ADDRESS 0x00003FFC

FIG.24A  | 0b1 | 0b01 | 0x89ABCDEF |

FIG.24B  TRACING SP  | 0x00003FF0 |

FIG.24C  TRACING SP  | 0x00003FF4 |

FIG.24D  READ 0x89ABCDEF FROM ADDRESS 0x00003FF0

FIG.25A  | 0b1 | 0b10 | 0x14 | 0xF0E1D2C3 |

FIG.25B  TRACING SP  | 0x00003FC0 |

FIG.25C  TRACING SP  | 0x00003FC0 |

FIG.25D  WRITE 0xF0E1D2C3 TO ADDRESS 0x00003FD0
(SP: 0x00003FC0, OFFSET: +0x10)

DEBUGGING SYSTEM, DEBUGGING CIRCUIT AND INFORMATION PROCESSING APPARATUS

BACKGROUND OF THE INVENTION

1. Field of the Invention

The present invention generally relates to debugging systems and debugging circuits, and more particularly to a debugging system and a debugging circuit for supporting debugging of an information processing apparatus, that are built into a microcontroller or the like. The present invention also relates to such an information processing apparatus that is a debugging target.

2. Description of the Related Art

In apparatuses including an information processing apparatus (hereinafter referred to as a CPU) that is typified by a microcontroller or the like, a debugging system is used in general when developing a program for operating the CPU. The debugging system supports the debugging, by displaying various operation information of the program that is to be developed, and providing a program developer with particular operating functions with respect to the program that is to be developed.

FIG. 1 is a system block diagram showing an example of a conventional debugging system. In FIG. 1, a 1-chip microcontroller 1 that is the target of the debugging, is connected to a host computer 3 via an external debugging apparatus 2. The microcontroller 1 has a CPU 11, a debugging circuit 12, a storage unit 31 and peripheral functions 14 and 15 that are connected via a bus 16. The microcontroller 1 is connected to the external debugging apparatus 2 via dedicated debugging pins 17.

The debugging system is formed by the debugging circuit 12 that is built into the microcontroller 1 and carries out various monitoring of the CPU 11, the external debugging apparatus 2 that carries out various debugging processes externally to the microcontroller 1, and the host computer 3 that executes a debugger software 10. The debugging circuit 12 and the external debugging apparatus 2 are connected via dedicated signal lines, and the external debugging apparatus 2 and the host computer 3 are connected via dedicated signal lines.

The trace functions are one of the main functions of the debugging system. The trace functions include an instruction trace function for obtaining execution log information of the instruction, and a data trace function for obtaining execution log information of the data access. It is extremely useful to obtain the log information (trace information) of the various operations of the CPU 11 in the debugging stage by these trace functions.

The amount of the trace information increases proportionally to the time required to acquire the trace information. In order to store a large amount of trace information in the debugging circuit 12 within the microcontroller 1, a storage unit having a large storage capacity is required within the debugging circuit 12, and both the chip area and the cost of the microcontroller 1 increase. For this reason, in general, a technique is used in which the debugging circuit 12 outputs the trace information to the external debugging apparatus 2, and the trace information is stored in the external debugging apparatus 2. This technique is used because there are no demands to form the external debugging apparatus 2 as a 1-chip device, and it is more advantageous from the point of view of the cost and the functions to provide the required storage unit in the external debugging apparatus 2 than to provide the storage unit having the large storage capacity in the debugging circuit 12 within the microcontroller 1.

FIG. 2 is a system block diagram showing structures of the debugging circuit 12 and the external debugging apparatus 2. The debugging circuit 12 has a trace apparatus 19. On the other hand, the external debugging apparatus 2 has a write control part 21, a trace data recording part 22, and a read control part 23. In the data trace function of the debugging system, when tracing the operation of the CPU 11 that is the debugging target, the trace apparatus 19 within the debugging circuit 12 monitors the data access of the CPU 11. When the trace apparatus 19 detects the access of the tracing target, the trace information is generated from the access type (read, write, size, etc.), the access address and the access data. Of the data accesses of the CPU 11 monitored by the debugging circuit 12, the stack access using the stack pointer (SP) and the data access excluding the stack access (hereinafter referred to as "a normal data access") are not distinguished from each other. For example, the stack access is for a PUSH instruction, a POP instruction, an EIT (Exception, Interrupt and Trap), RETI instruction, a stack pointer relative access instruction or the like. Hence, the debugging circuit 12 treats both the stack access and the normal data access as the same trace information. In addition, the external debugging apparatus 2 which receives the trace information also treats the stack access and the normal data access as the same trace information.

After generating the trace information, the debugging circuit 12 outputs the trace information to the external debugging apparatus 2 via the dedicated debugging pins 17. In general, the dedicated debugging pins 17 are not used at times other than the debugging. For this reason, from the point of view of reducing the cost, it is desirable to realize the dedicated debugging pins 17, that are not used at time other than the debugging, by a smallest possible number of pins. In addition, it is desirable to compress the information output via the dedicated debugging pins 17, so as to output a maximum amount of information by a small number of pins and a limited bandwidth.

FIG. 3 is a diagram for explaining the data trace function. As shown in FIG. 3, when the debugger software 10 makes a data trace set instruction, the external debugging apparatus 2 initializes the write control part 21, and the debugging circuit 12 sets the data trace. In addition, when the debugger software 10 makes a trace start instruction with respect to the debugging target program, the CPU 11 starts execution of the debugging target program. The CPU 11 executes the debugging target program, the debugging circuit 12 generates the trace data, and the external debugging apparatus 2 records the trace data by the trace data recording part 22. The CPU 11 interrupts the execution of the debugging target program when a condition for interrupting execution of the debugging target program is satisfied, and the debugger software 10 detects the trace interruption of the debugging target program.

The debugger software 10 makes a trace data amount notifying instruction, and the external debugging apparatus 2 makes a trace data amount notification. The debugger software 10 makes a trace data read instruction, and the external debugging apparatus 2 reads and sends the trace data. Thereafter, the debugger software 10 receives the trace data, moves the received trace data in a work area, analyzes the received trace data, creates a trace list, and displays the trace result.

FIG. 4 is a diagram for explaining extraction of the stack access and the normal data access. FIG. 4 shows, time-sequentially, the data trace information that is output to the external debugging apparatus 2 via the dedicated debugging pins 17. In FIG. 4, shaded rectangular marks indicate the trace data of the stack access, and white rectangular marks indicate the trace data of the normal data access.

FIG. 5 is a diagram for explaining analysis and separation of the trace list of the data trace. In FIG. 5, the trace list shown on the left side is separated into a trace list of the normal data access and a trace list of the stack access that are shown on the right side, by an analyzing part 10A and a separating part 10B of the debugger software 10.

The conventional systems have the following first and second problems described hereunder.

The first problem is caused by the data trace that does not distinguish the stack access and the normal data access.

According to the conventional data trace, the debugging system does not distinguish the stack access and the normal data access from each other. Hence, the debugging circuit 12 treats the stack access and the normal data access as the same trace information, and outputs all of the trace information, including the stack access and the normal data access, via the dedicated debugging pins 17. For this reason, the external debugging apparatus 2 stores all of the trace information, including the stack access and the normal data access, in a storage unit (not shown). The debugger software 10 running on the host computer 3 creates a data access execution log list (trace list) based on the trace information that is stored in the external debugging apparatus 2. In the trace list that is created, the stack access and the normal data access are not distinguished from each other. Consequently, if only the stack access is to be traced or, only the normal data access is to be traced, the debugger software 10 running on the host computer 3 must carry out the processes of analyzing the trace list, and separating the trace list into a trace list of the stack access and a trace list of the normal data access.

For example, if only one of the stack access and the normal data access is to be traced, of the trace data output from the dedicated debugging pins 17, the trace data other than those of the trace target are finally discarded. For this reason, the trace data output from the dedicated debugging pins 17 include unnecessary trace data, thereby causing the limited bandwidth of the dedicated debugging pins 17 and the storage capacity of the storage unit that stores the trace data within the external debugging apparatus 2 to be unnecessarily large. Furthermore, in the process of separating the stack access and the normal data access, the resources such as the external debugging apparatus 2 and the host computer 3 are utilized, thereby increasing the load on the resources.

The second problem concerns the compression of the data trace information by positively utilizing the characteristics of the stack access.

As described above with respect to the first problem, the conventional data trace does not distinguish the stack access and the normal data access from each other. Hence, of the trace information of the data trace, the information of all of the bits of the address is compressed using a compression technique. In other words, the same address compression technique is used for the stack access and the normal data access. As a result, the compression rate of the stack access is the same as that of the normal data access. The compression technique based on the address information of all of the bits is proposed in Japanese Laid-Open Patent Applications No. 2004-178591 and No. 2004-38981, for example.

On the other hand, compared to the normal data access, the characteristics of the stack access are such that the address that is accessed has locality and continuity. A description will now be given of these characteristics of the stack access. FIGS. 6 through 8 are diagrams for explaining the stack access of a 32-bit CPU. FIG. 6 shows a PUSH access which pushes a general-purpose register R0, FIG. 7 shows a POP access which pops to the general-purpose register R0, and FIG. 8 shows a stack pointer relative access which writes to the general-purpose register R0 with an offset of +0x8 with respect to the value of the stack pointer.

Generally, the stack access includes the PUSH access to the stack, and the POP access from the stack. Particular examples of the PUSH access include CPU register save accesses at the time of the PUSH instruction and the EIT (Exception, Interrupt and Trap). When such a PUSH access is executed, the CPU decrements the stack pointer (SP) according to the data width for which the stack access is made, and thereafter makes a write access to the address indicated by the SP, as shown in FIG. 6. Particular examples of the POP access include CPU register restore accesses at the time of the POP instruction and the RETI instruction (interrupt return instruction). When such a POP access is executed, the CPU makes a read access from the address indicated by the SP, and thereafter increments the SP depending on the data width for which the stack access is made. Generally, the data widths of the PUSH access and the POP access are fixed, and the values with which the SP is decremented and incremented are fixed. Hence, in the case of the PUSH access or the POP access, the SP is incremented or decremented, and the address of the stack access has locality and continuity.

Although dependent upon the instruction set of the CPU, the stack access includes, in addition to the POP access and the PUSH access described above, an access using the SP. For example, there is the stack pointer relative access instruction that makes the stack pointer relative access (hereinafter referred to as an SP relative access). According to the SP relative access instruction, the CPU makes a read access or a write access to the address represented relatively from the SP using an offset value from the value of the SP included in the operand of the instruction. The address of the SP relative access has no continuity, but has locality since the access is made within the offset range from the SP.

It may be regarded extremely useful to compress the address portion of the trace information of the stack access by utilizing these characteristics. However, in the data access of the CPU monitored by the debugging circuit, the stack access and the normal data access are not distinguished from each other, and it is impossible to easily carry out a compression which utilizes the characteristics of the stack access.

SUMMARY OF THE INVENTION

Accordingly, it is a general object of the present invention to provide a novel and useful debugging system, debugging circuit and information processing apparatus, in which the problems described above are suppressed.

Another and more specific object of the present invention is to provide a debugging system, a debugging circuit and information processing apparatus, which eliminate at least the first problem described above, and desirably also eliminate the second problem described above. In other words, one object of the present invention is to enable independent tracing of a stack access and a normal data access, and to reduce the processes of the debugging system. In addition, another object of the present invention is to more desirably enable an information compression that takes into consideration the locality and the continuity of the address of the stack address, with respect to the trace information of the stack access, so as to reduce the amount of trace information of the stack access.

Still another object of the present invention is to provide a debugging system comprising a CPU that is a debugging target and a debugging circuit, wherein the CPU comprises an output part configured to independently output stack access information of a stack access and data access information of a data access excluding the stack access, as data access information of the CPU that is monitored by the debugging circuit; and the debugging circuit comprises a trace part configured to independently generate and output trace information of the stack access from the stack access information that is output from the CPU and trace information of the data access excluding the stack access from the data access information that is output from the CPU.

A further object of the present invention is to provide a debugging circuit for debugging a CPU that independently outputs stack access information of a stack access and data access information of a data access excluding the stack access, as data access information, comprising a trace part configured to independently generate and output trace information of the stack access from the stack access information that is output from the CPU and trace information of the data access excluding the stack access from the data access information that is output from the CPU.

Another object of the present invention is to provide an information processing apparatus that is monitored by a debugging circuit, comprising an output part configured to independently output stack access information of a stack access and data access information of a data access excluding the stack access, as data access information of the information processing apparatus.

According to the present invention, it is possible to eliminate at least the first problem described above, and desirably also eliminate the second problem described above. In other words, the present invention enables independent tracing of a stack access and a normal data access, and reducing the processes of the debugging system. In addition, the present invention desirably also enables an information compression that takes into consideration the locality and the continuity of the address of the stack address, with respect to the trace information of the stack access, so as to reduce the amount of trace information of the stack access.

Other objects and further features of the present invention will be apparent from the following detailed description when read in conjunction with the accompanying drawings.

BRIEF DESCRIPTION OF THE DRAWINGS

FIG. 10 is a system block diagram showing a structure of a CPU of the first embodiment;

FIGS. 11A through 11C are diagrams for explaining trace information formats and a data trace ID of the first embodiment;

FIGS. 18A through 18C are diagrams for explaining a trace information format and a data trace ID of the third embodiment;

FIGS. 21A through 21D are diagrams for explaining a trace information format, stack access information and stack access added information of the fourth embodiment;

FIGS. 22A through 22D are diagrams for explaining trace data at the time of an SP rewrite, tracing SP and building of a trace list;

FIGS. 23A through 23D are diagrams for explaining trace data at the time of a PUSH access, tracing SP and building of a trace list;

FIGS. 24A through 24D are diagrams for explaining trace data at the time of a POP access, tracing SP and building of a trace list; and FIGS. 25A through 25D are diagrams for explaining trace data at the time of an SP relative access, tracing SP and building of a trace list.

DESCRIPTION OF THE PREFERRED EMBODIMENTS

Figure 1:
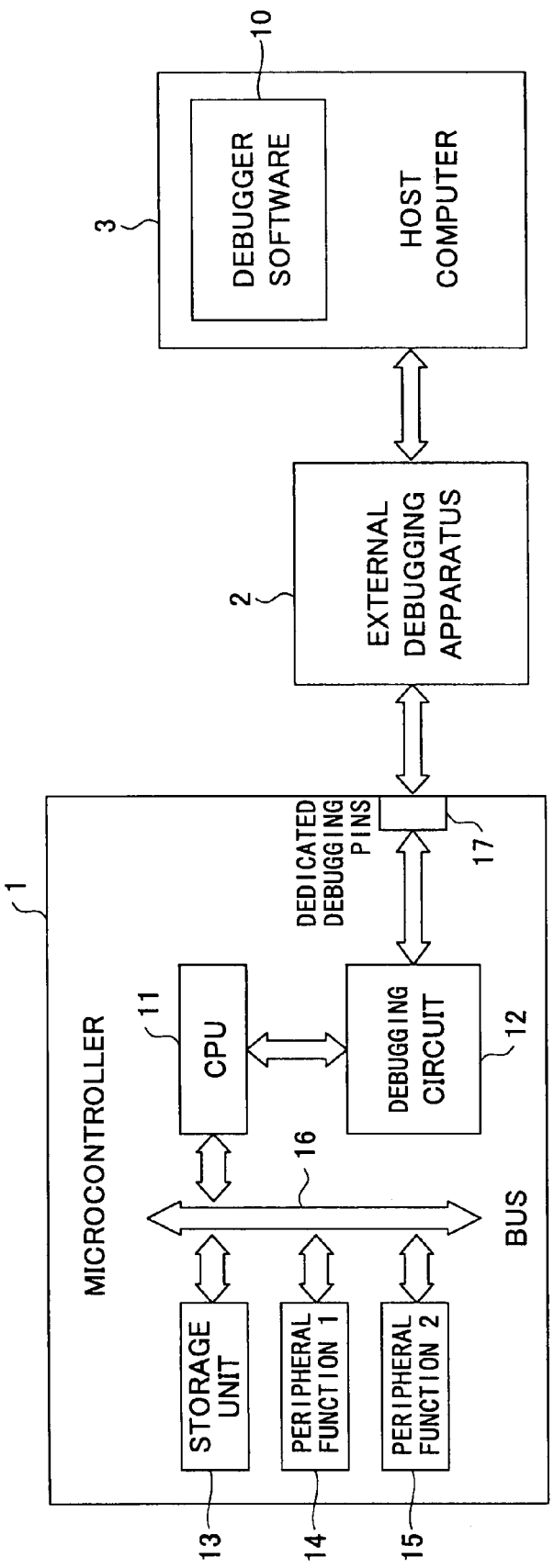
FIG. 1 is a system block diagram showing an example of a conventional debugging system.
Figure 2:
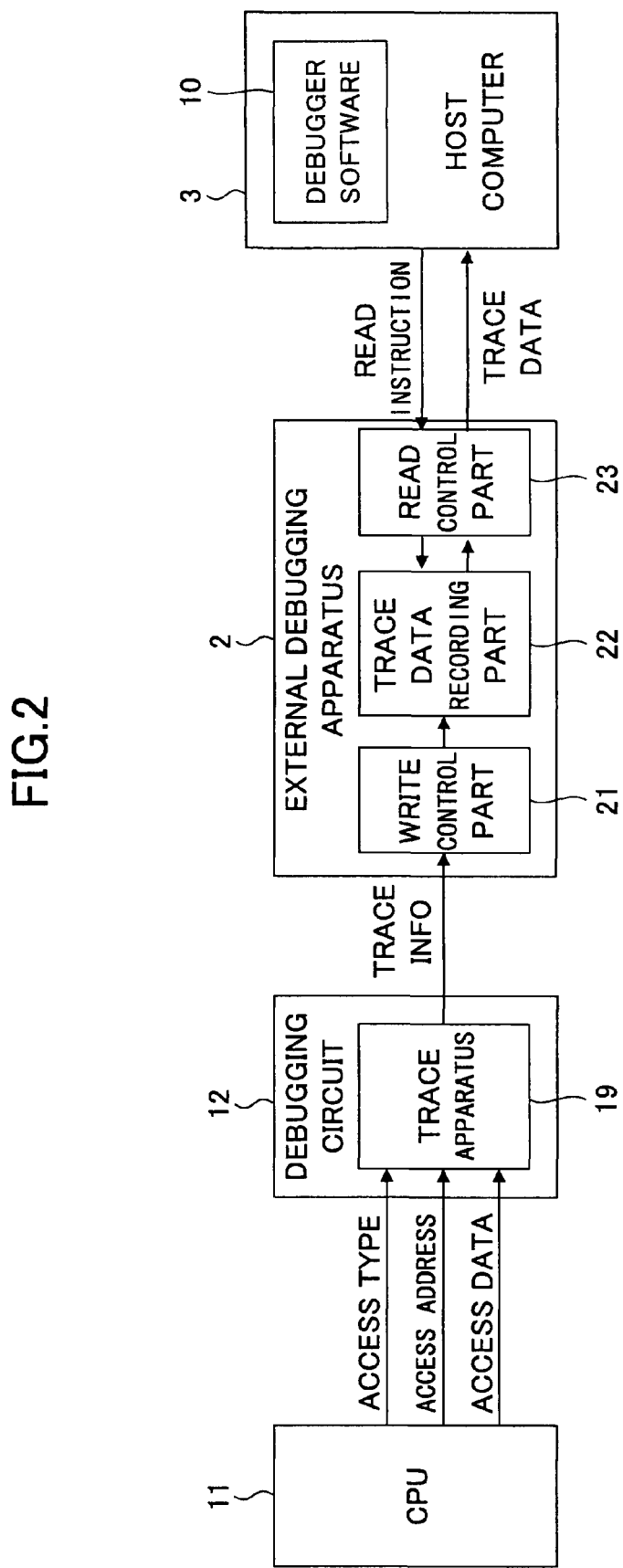
FIG. 2 is a system block diagram showing structures of a debugging circuit and an external debugging apparatus.
Figure 3:
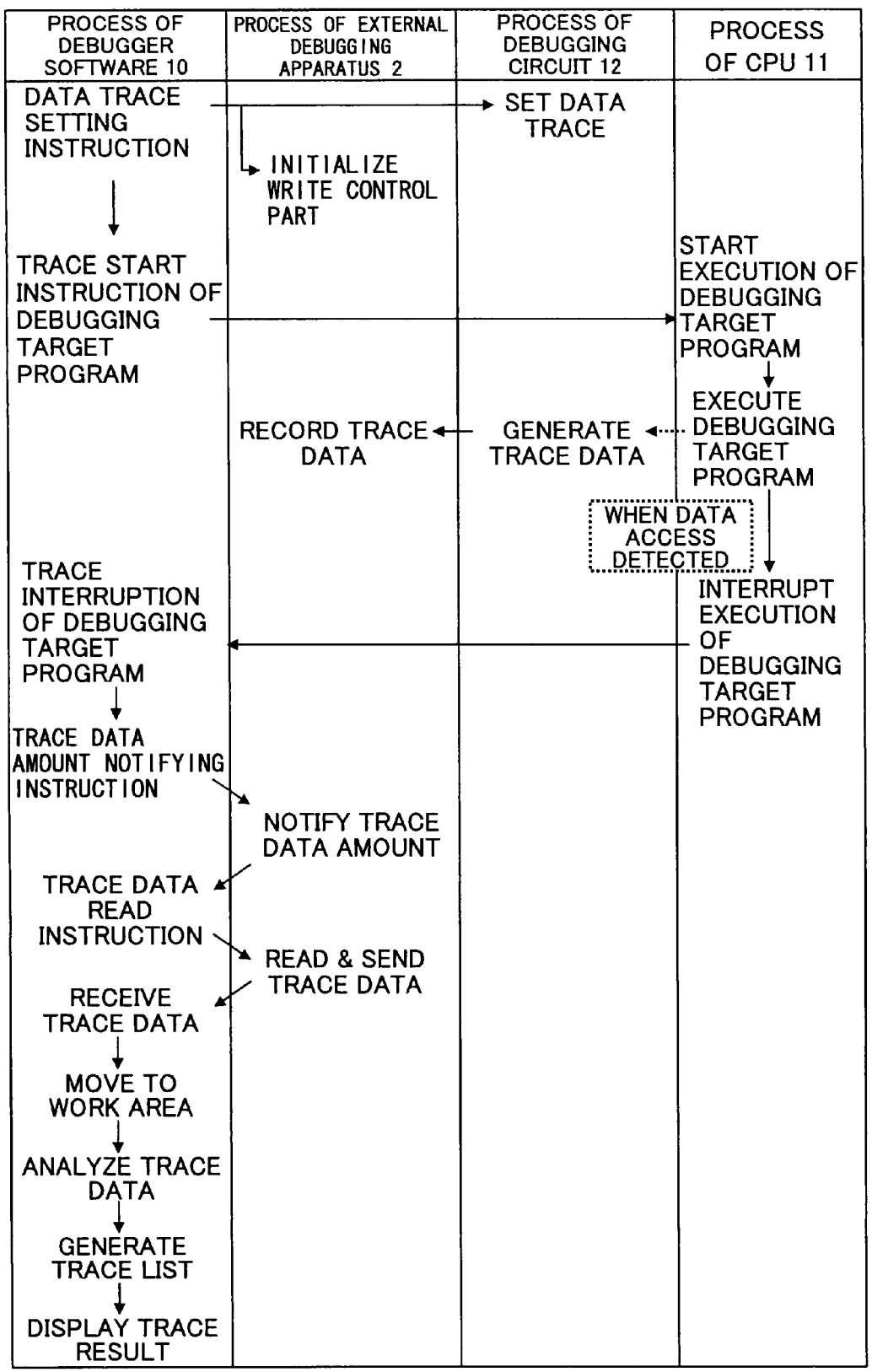
FIG. 3 is a diagram for explaining a data trace function.
Figure 4:
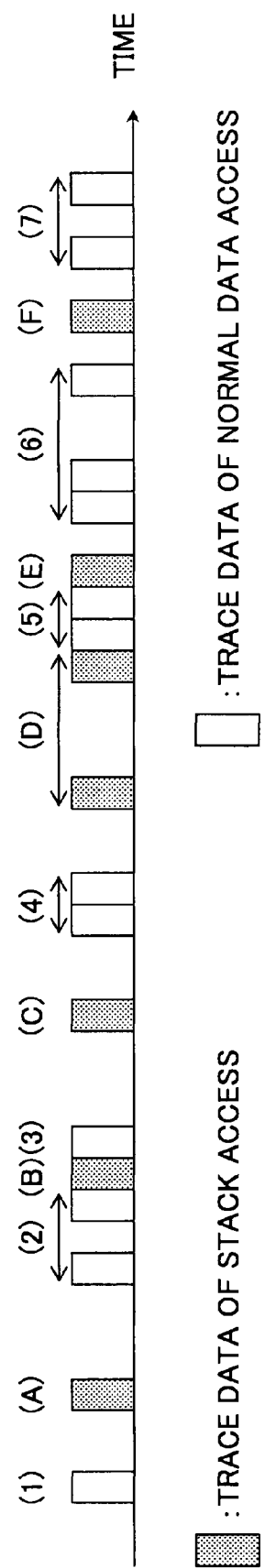
FIG. 4 is a diagram for explaining extraction of a stack access and a normal data access.
Figure 5:
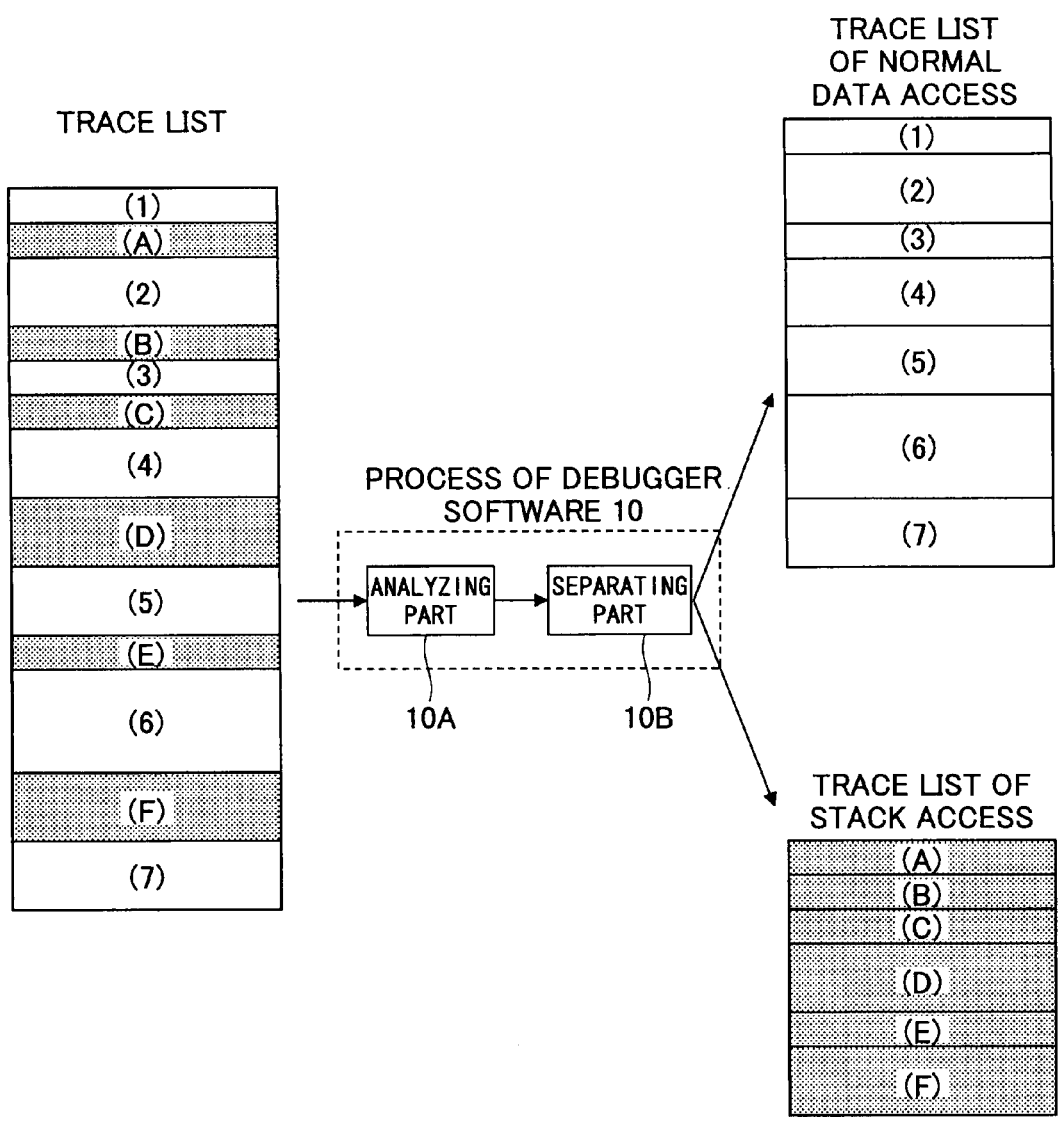
FIG. 5 is a diagram for explaining analysis and separation of a trace list of the data trace.

The present invention is applied to a debugging system which supports debugging of an information processing apparatus (CPU) that is built into a microcontroller or the like. In the trace function for the data access of the debugging system, the stack access and the data access excluding the stack access are monitored as independent accesses, and the stack access and the data access are selectively traced.

The trace information of the stack access may be compressed by utilizing the locality and the continuity of the address of the stack access.

A first feature of the present invention for eliminating the first problem described above, includes treating the stack access and the normal data access independently, in each of the CPU and a debugging circuit.

More particularly, the CPU identifies by itself whether the data access made by the CPU is a stack access or a normal data access. The CPU outputs the data access information that is monitored by the debugging circuit for the data trace, by independently generating two kinds of access information, namely, the access information for the stack access and the access information for the normal data access. The debugging circuit which monitors the access information has a trace apparatus for the stack access, and a trace apparatus for the normal data access. The trace apparatus for the stack access generates the trace information of the stack access from the access information of stack access, and the trace apparatus for the normal data access generates the trace information of the normal data access from the access information of the normal data access.

In addition, the debugging circuit includes a means for holding information indicating that the trace with respect to the stack access and the trace output are permitted, a means for holding information indicating that the trace with respect to the normal data access and the trace output are permitted, and a means for multiplexing the trace information of the stack access and the trace information of the normal data access. The debugging circuit outputs the trace information of the stack access and the normal data access, having the setting to permit (enable) the trace and the trace output, via dedicated debugging pins.

A second feature of the present invention for eliminating the second problem described above, includes representing an address portion of the trace information of the stack access by an absolute value and a relative value using information of the stack access made in the debugging system.

According to the first feature of the present invention, the debugging system can independently trace the stack access and the normal data access. Hence, it is possible to apply different trace information compression techniques for the trace of the stack access and the trace of the normal data access. Furthermore, the trace information may be compressed according to the following method, by taken into consideration the locality and the continuity of the address of the stack access.

In other words, in the trace of the data access, the trace information is generated based on three kinds of information, namely, the access type, the address and the data. On the other hand, in the trace of the stack access, the trace information is generated based on two kinds of information, namely, the stack access information and the stack access data. The stack access information includes information related to the stack access (PUSH access, POP access, SP relative read access, SP relative write access, offset values of the SP relative access and the like), and information related to SP rewrite.

Figure 6:
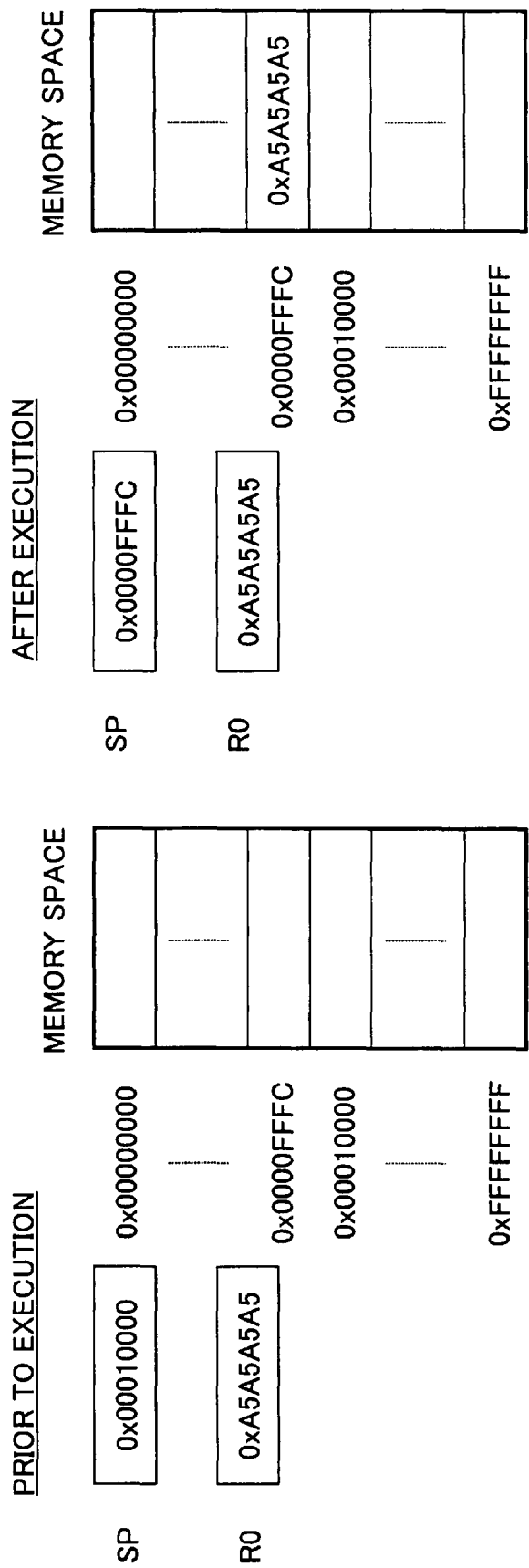
FIG. 6 is a diagram for explaining the stack access in a 32-bit CPU.
Figure 7:
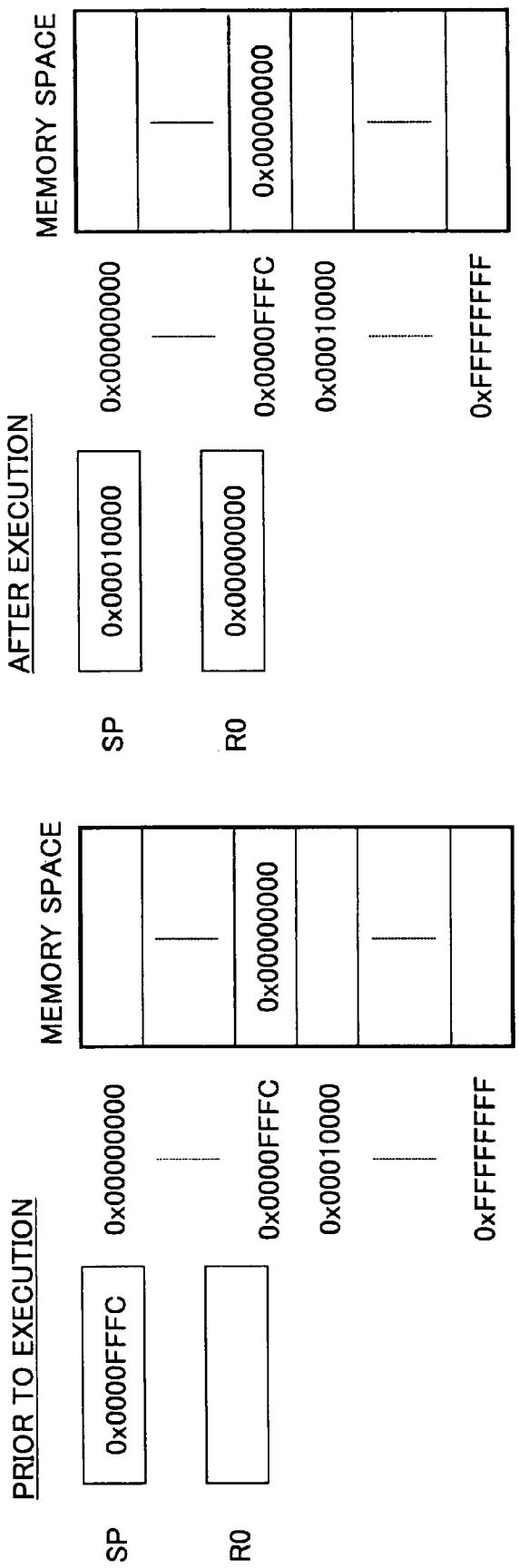
FIG. 7 is a diagram for explaining the stack access in a 32-bit CPU.
Figure 8:
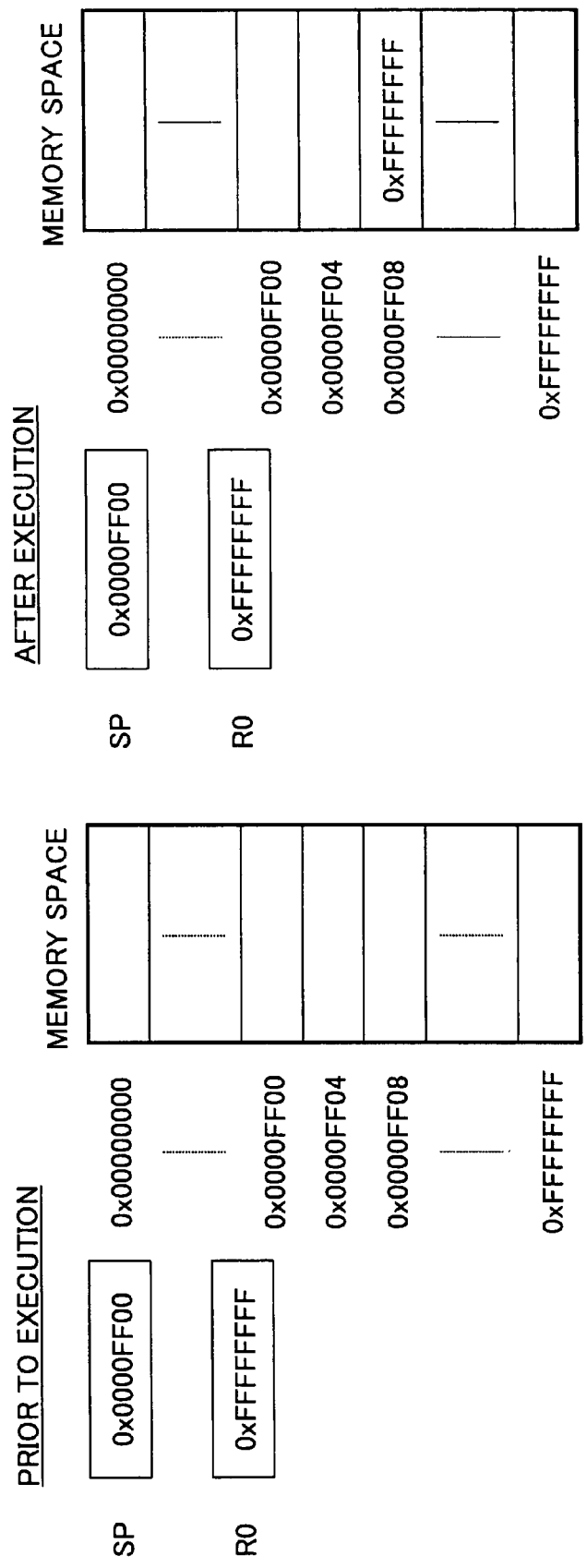
FIG. 8 is a diagram for explaining the stack access in a 32-bit CPU.

As described above in conjunction with FIGS. 6 and 7, in the PUSH access or the POP access, for example, the read or write of the stack access is uniquely determined when the stack access thereof is generated. In addition, if the present SP value is known, the address of the stack access and the SP value after the stack access are also uniquely determined. For example, when the SP relative read access or the SP relative write access described above in conjunction with FIG. 8 is generated, the address of the stack access is uniquely determined if the information related to the offset value from the SP is obtained and the present SP value is known. Accordingly, the access information of the executed stack access represents the address of the stack access by a relative value with respect to the SP.

If the present SP value is known, the address of the executed stack access is uniquely determined as described above. In order to know the present SP value, a situation where the SP rewrite is generated, such as when the initial value of the SP is set or the SP is rewritten at an intermediate stage, for example, is utilized. The stack access information also includes information related to the SP rewrite. When the SP rewrite is generated, the information indicating the SP rewrite is generated by the stack access information. At the same time, information of the newly rewritten SP value is generated. The SP value is represented by an absolute value at the time of the SP rewrite. It is possible to always know the present SP value by reflecting to the SP value that is represented by the absolute value the updating after execution of the PUSH access or the POP access.

Accordingly, by using the stack access information and not the address of the stack access, it becomes possible to trace the address of the stack access and the present SP value. In addition, since the stack access information includes the access type, it becomes possible to know whether the access is a read or a write.

Therefore, the CPU generates the stack access information and the stack access data when making the stack access. The debugging circuit generates the trace information of the stack access, based on the two kinds of information, namely, the stack access information and the stack access data, output by the CPU. An external debugging apparatus and a debugger software which receive the trace information of the stack access traces the SP value and the stack access using the two kinds of information.

According to the first feature of the present invention, the debugging circuit can output the trace information of the stack access and the trace information of the normal data access as independent trace information. That is, the debugging system can independently process the trace information of the stack access and the trace information of the normal data access. In addition, the debugging circuit can selectively output the trace information of the stack access and the trace information of the normal data access. In other words, the debugging system can obtain and process only the trace information of the desired trace target.

According to the second feature of the present invention, the debugging circuit can represent the trace information of the stack access by a smaller amount of information using the generated stack access information and the stack access data, compared to the case where the information related to the read, write, address and data of the stack access is used. In other words, of the data trace of the debugging system, the trace information of the stack access can be compressed. Furthermore, in the process of restoring the compressed trace information, it becomes possible to trace not only the stack access but also the SP value.

First Embodiment

Figure 9:
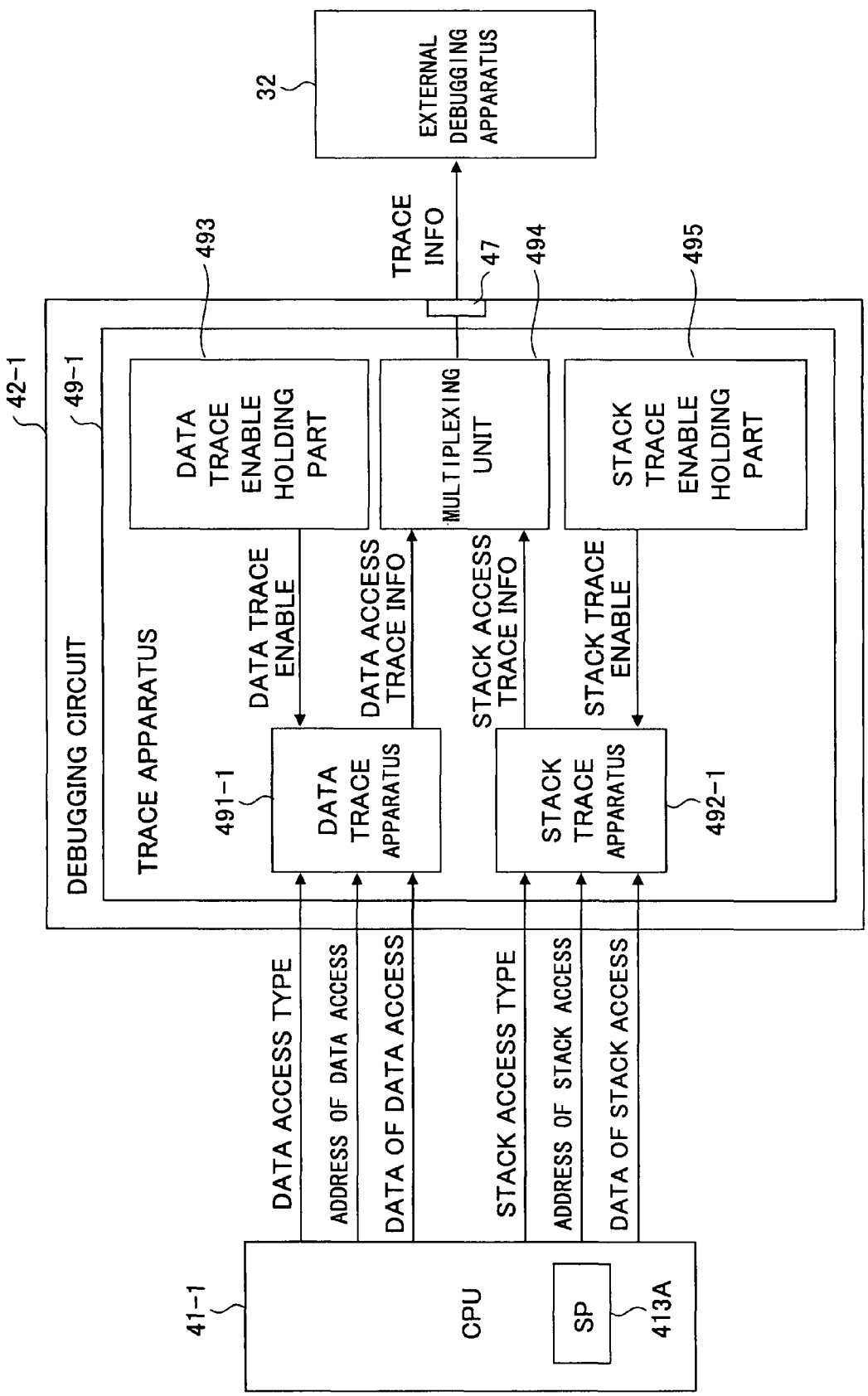
FIG. 9 is a system block diagram showing a debugging system of a first embodiment.

Next, a description will be given of a first embodiment of the present invention. This first embodiment has the first feature of the present invention described above. FIG. 9 is a system block diagram showing a debugging system of the first embodiment, and FIG. 10 is a system block diagram showing a structure of a CPU of this first embodiment.

As shown in FIG. 9, a CPU 41-1 within a 1-chip microcontroller (not shown) that is the debugging target, is connected to an external debugging apparatus 32 via a debugging circuit 42-1 within the microcontroller. The basic structure of the microcontroller itself may be the same as that of the microcontroller 1 shown in FIG. 1, for example.

The CPU 41-1 has an instruction execution control part 411, a memory access control part 412, a CPU register 413 having a stack pointer (SP) 413A, a data trace interface 414, a stack trace interface 415, and a data bus interface 416 that are connected as shown in FIG. 10. At the time of the memory access, the access is generated from the memory access control part 412 with respect to the data bus interface 416. At the same time, the memory access control part 412 generates an SP access signal indicating whether or not the access is a stack access. When the data access is detected and the SP access signal is "0" which indicates that the access is not a stack access, the data trace interface 414 generates the trace information of the data access. The data access type, address and data generated by the data trace interface 414 are supplied to a data trace apparatus 491-1 of a trace apparatus 49-1 within the debugging circuit 42-1. When the data access is detected and the SP access signal is "1" which indicates that the access is a stack access, the stack trace interface 415 generates the trace information of the stack access. The stack access type, address and data generated by the stack trace interface 415 are supplied to a stack trace apparatus 492-1 of the trace apparatus 49-1 within the debugging circuit 42-1. The data bus interface 416 is connected to the storage unit (not shown), the peripheral functions (not shown) and the like within the microcontroller, via a bus (not shown) within the microcontroller.

The CPU 41-1 can identify whether the data access executed by itself is a stack access or a normal data access. Hence, by using this ability, the CPU 41-1 generates the stack access type (read or write information) exclusively for the stack access, the address of the stack access and the data of the stack access, with respect to the stack access executed by the CPU 41-1. Similarly, the CPU 41-1 generates the data access type (read or write information, the size information and the like), the address of the data access and the data of the data access, with respect to the normal data access executed by the CPU 41-1.

The debugging circuit 42-1 has dedicated debugging pins 47, and the trace apparatus 49-1 which generates the trace information that is output to the dedicated debugging pins 47. The trace apparatus 49-1 has the data trace apparatus 491-1, the stack trace apparatus 492-1, a holding part 493 for holding the data trace enable, a multiplexing unit 494, and a holding part 495 for holding the stack trace enable which are connected as shown in FIG. 9.

The trace apparatus 49-1 also has an apparatus for making an instruction trace and an apparatus for making a data trace, but the subject matter of the present invention is not directly related to the instruction trace. Thus, the illustration of the apparatus for making the instruction trace is omitted in FIG. 9. The holding part 493 for holding the data trace enable and the holding part 495 for holding the stack trace enable are respectively made up of a register, and are set by an access from the CPU 41-1 which executes a debugging control program or a register rewrite command from the external debugging apparatus 32. When the normal data trace is enabled by the data trace enable that is held in the holding part 493, the data trace apparatus 491-1 monitors the data access type (read or write information, size information and the like), the address of the data access and the data of the data access generated by the CPU 41-1, and generates the trace information of the normal data access. When the stack trace is enabled by the stack trace enable that is held in the holding part 495, the stack trace apparatus 492-1 monitors the stack access type (read or write information), the address of the stack access and the data of the stack access generated by the CPU 41-1, and generates the trace information of the stack access. The multiplexing unit 494 multiplexes the trace information of the normal data access generated by the data trace apparatus 491-1 and the trace information of the stack access generated by the stack trace apparatus 492-1, and outputs the multiplexed information as the trace information. The trace information output from the multiplexing unit 494 is output to the external debugging apparatus 32 via the dedicated debugging pins 47. According to the settings of the holding part 493 for the data trace enable and the holding part 495 for the stack trace enable, it is possible to selectively output the trace information of only the stack access or, output the trace information of only the normal data access or, output the trace information of both the stack access and the normal data access or, to output no trace information.

FIGS. 11A through 11C are diagrams for explaining trace information formats and a data trace ID of the first embodiment. FIG. 11A shows the trace information format of the normal data access, FIG. 11B shows the trace information format of the stack access, and FIG. 11C shows the data trace ID. In FIGS. 11A through 11C, it is assumed for the sake of convenience that the CPU 41-1 is a 32-bit CPU.

As shown in FIG. 11A, the trace information format of the normal data access includes a 1-bit data trace ID, a 1-bit read or write information, a 2-bit size information, a 32-bit address, and an 8-bit or 16-bit or 32-bit data. In addition, as shown in FIG. 11B, the trace information format of the stack access includes a 1-bit data trace ID, a 1-bit read or write information, a 32-bit address, and a 32-bit data. Further, as shown in FIG. 11C, the data trace ID is 1-bit, and indicates that the trace information is for the normal data access trace if the value is "0b0", and indicates that the trace information is for the stack access trace if the value is "0b1".

In FIGS. 11A and 11B, the "address" indicates the address at the access destination, and may be compressed according to the techniques proposed in the Japanese Laid-Open Patent Applications No. 2004-178591 and No. 2004-38981, for example, but in this embodiment, it is assumed that all of the 32-bit address information is used. The "data" in the trace information format of the normal data access shown in FIG. 11A has a variable length of 8 bits, 16 bits or 32 bits, and this bit length is indicated by the "size". The data is represented by 8 bits, 16 bits or 32 bits depending on the value of the "size". The "data" in the trace information format of the stack access shown in FIG. 11B has a fixed length of 32 bits, and no "size" information is required.

The external debugging apparatus 32 stores the trace information in an internal storage unit (not shown). The debugger software within a host computer (not shown) that is connected to the external debugging apparatus 32 reads the trace information from the external debugging apparatus 32, creates a trace list from the trace information of the data access, and provides the trace information to a program developer. The debugger software can identify from the "data trace ID" shown in FIG. 11C whether the trace information is for the stack access or the normal data access. Hence, the debugger software can easily create from the trace information two trace lists, namely, the trace list for the stack access and the trace list for the normal data access.

The "data trace ID" may be omitted in a case where only one of the stack access and the normal data access is traced, because the debugger software in this case knows which access is being traced.

Second Embodiment

Figure 12:
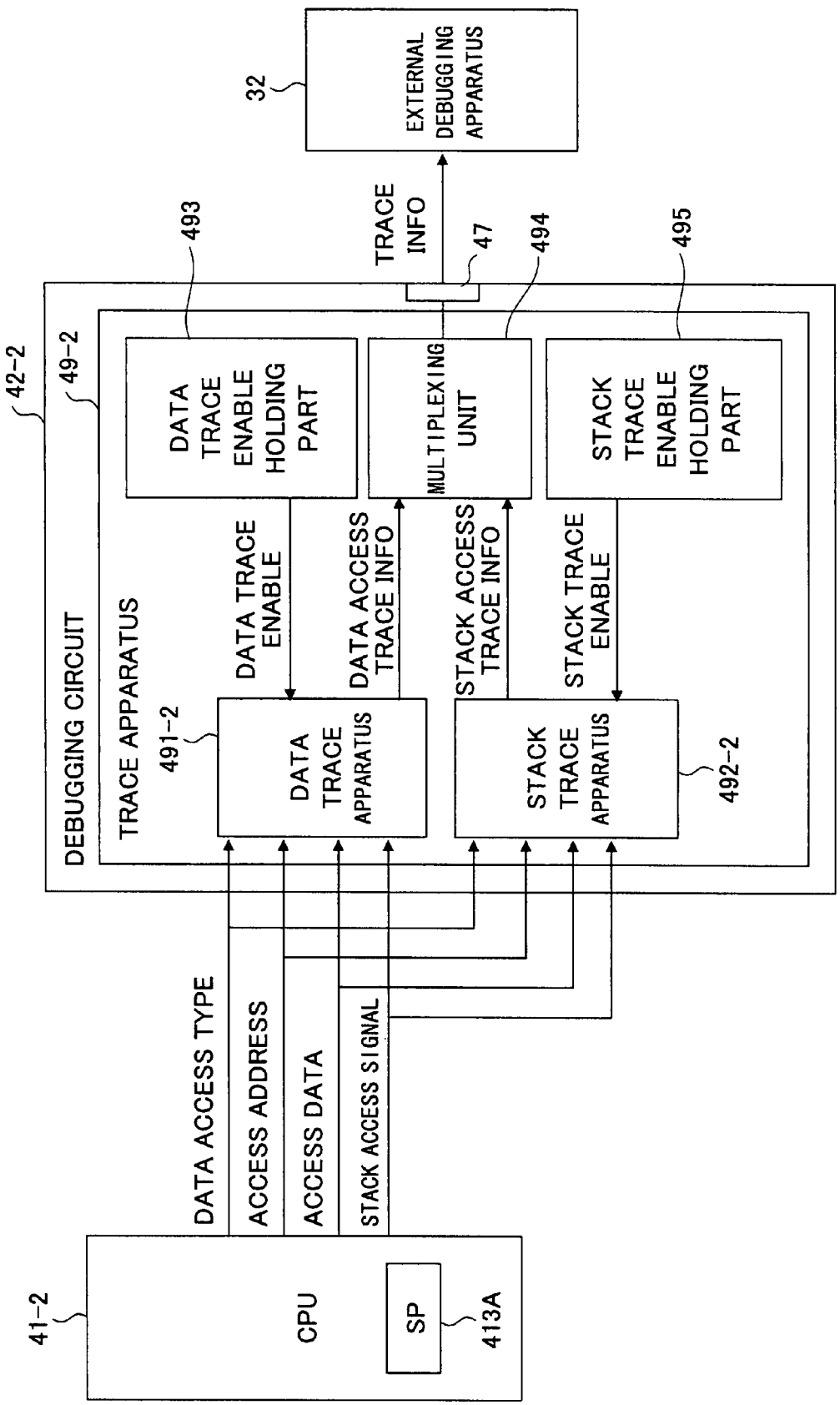
FIG. 12 is a system block diagram showing a debugging system of a second embodiment.
Figure 13:
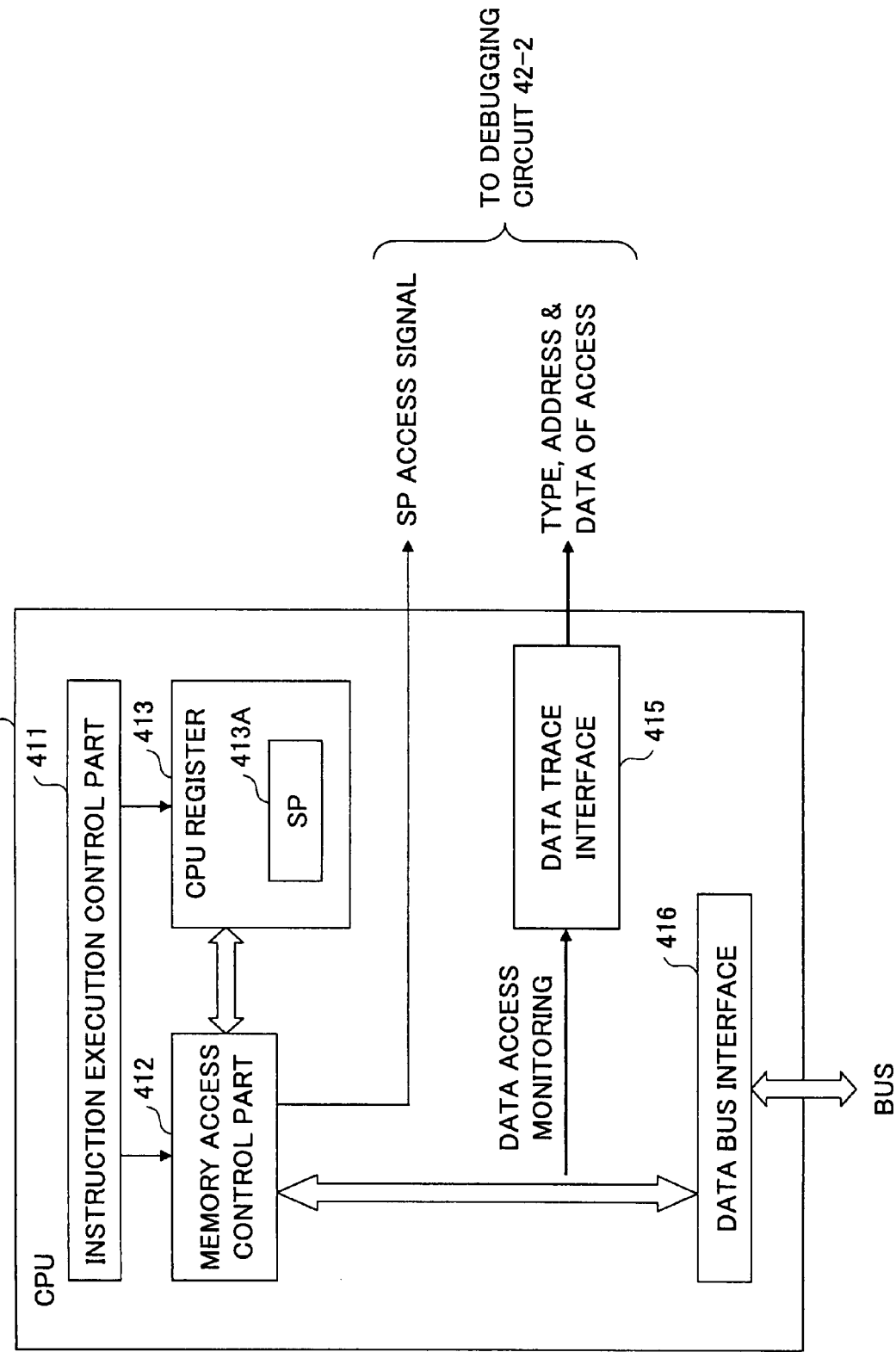
FIG. 13 is a system block diagram showing a structure of a CPU of the second embodiment.
Figure 14:
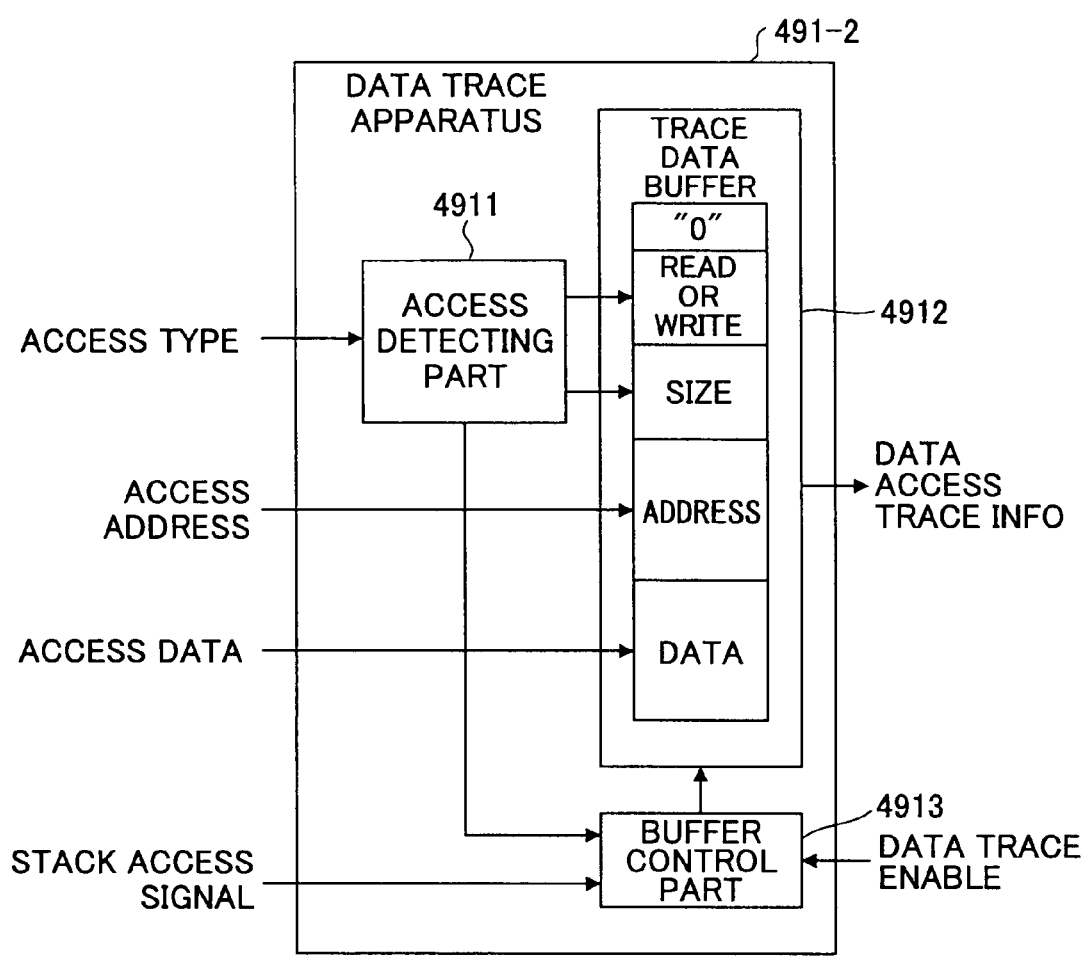
FIG. 14 is a system block diagram showing a structure of a data trace apparatus of the second embodiment.
Figure 15:
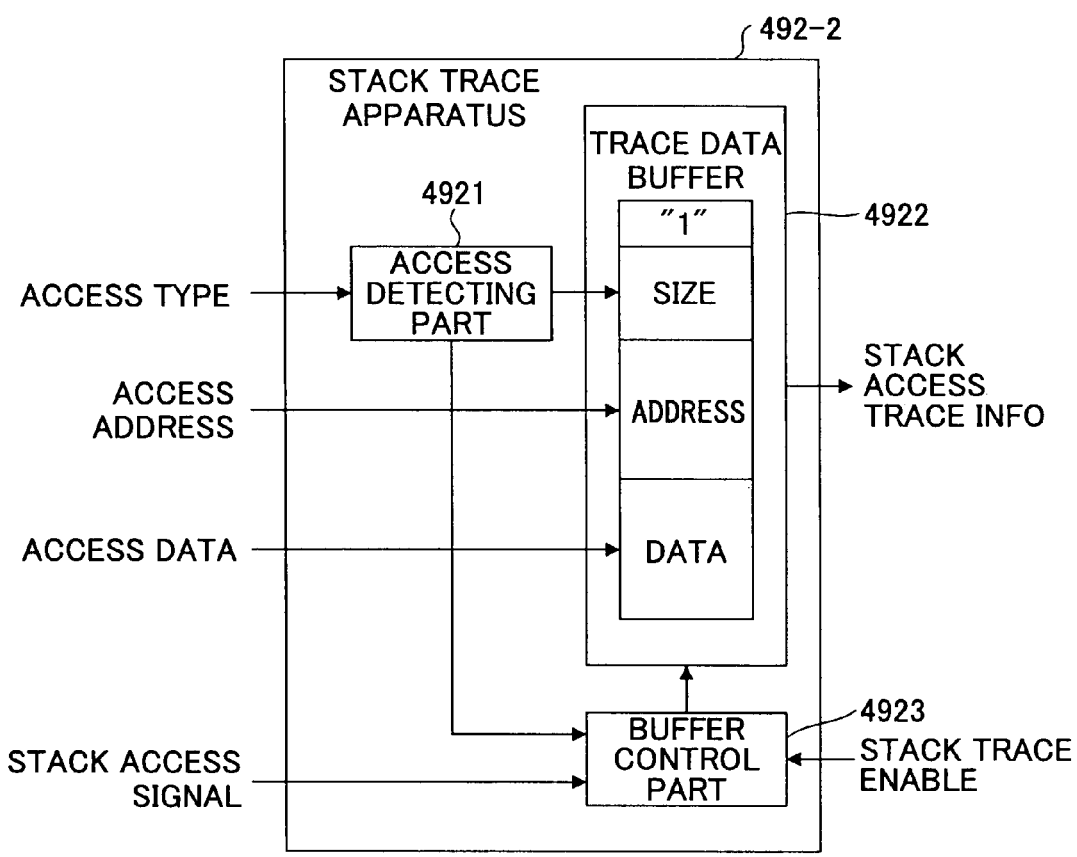
FIG. 15 is a system block diagram showing a structure of a stack trace apparatus of the second embodiment.

Next, a description will be given of a second embodiment of the present invention. This second embodiment has the first feature of the present invention described above. FIG. 12 is a system block diagram showing a debugging system of this second embodiment, and FIG. 13 is a system block diagram showing a structure of a CPU of this second embodiment. In addition, FIG. 14 is a system block diagram showing a structure of a data trace apparatus of this second embodiment, and FIG. 15 is a system block diagram showing a structure of a stack trace apparatus of this second embodiment. In FIGS. 12 and 13, those parts that are the same as those corresponding parts in FIGS. 9 and 10 are designated by the same reference numerals, and a description thereof will be omitted.

A description will be given of the differences between this second embodiment and the first embodiment described above. In the first embodiment, the CPU 41-1 judges whether the executed data access is a stack access or the normal data access, and independently generates the access information of the respective data accesses. In addition, the debugging circuit 42-1 monitors the access information of stack access and the normal data access. On the other hand, in this second embodiment, a CPU 41-2 outputs, together with the access information of the executed data access, a stack access signal which indicates whether or not the executed data access is a stack access. Hence, as shown in FIG. 13, no data trace interface is provided in the CPU 41-2.

The structure of a debugging circuit 42-2 is basically the same as that of the debugging circuit 42-1 of the first embodiment. In addition, the structure of a trace apparatus 49-2 is basically the same as that of the trace apparatus 49-1 of the first embodiment. In this second embodiment, the information from the CPU 41-2 that is monitored by a data trace apparatus 491-2 and a stack trace apparatus 492-2 within the trace apparatus 49-2 are different from the information monitored in the first embodiment. The data trace apparatus 491-2 and the stack trace apparatus 492-2 monitor the data access information and the stack access signal output from the CPU 41-2.

The data trace apparatus 491-2 has an access detecting part 4911, a trace data buffer 4912, and a buffer control part 4913 that are connected as shown in FIG. 14. The trace data having the trace information format shown in FIG. 11A is stored in and read from the trace data buffer 4912 in response to an access detection made by the access detecting part 4911, under the control of the buffer control part 4913. The data trace apparatus 491-2 generates the trace information of the normal data access when the tracing of the normal data access by the data trace apparatus 491-2 is enabled by the data trace enable held in the holding part 493 and the stack access signal is "0" which indicates that the data access is not a stack access.

The stack trace apparatus 492-2 has an access detecting part 4921, a trace data buffer 4922, and a buffer control part 4923 that are connected as shown in FIG. 15. The trace data having the trace information format shown in FIG. 11B is stored in and read from the trace data buffer 4922 in response to an access detection made by the access detecting part 4921, under the control of the buffer control part 4923. The stack trace apparatus 492-2 generates the trace information of the stack access when the tracing of the stack access by the stack trace apparatus 492-2 is enabled by the stack trace enable held in the holding part 495 and the stack access signal is "1" which indicates that the data access is a stack access. The subsequent processes including that of the multiplexing unit 494 within the trace apparatus 49-2 are the same as those of the first embodiment described above.

Third Embodiment

Figure 16:
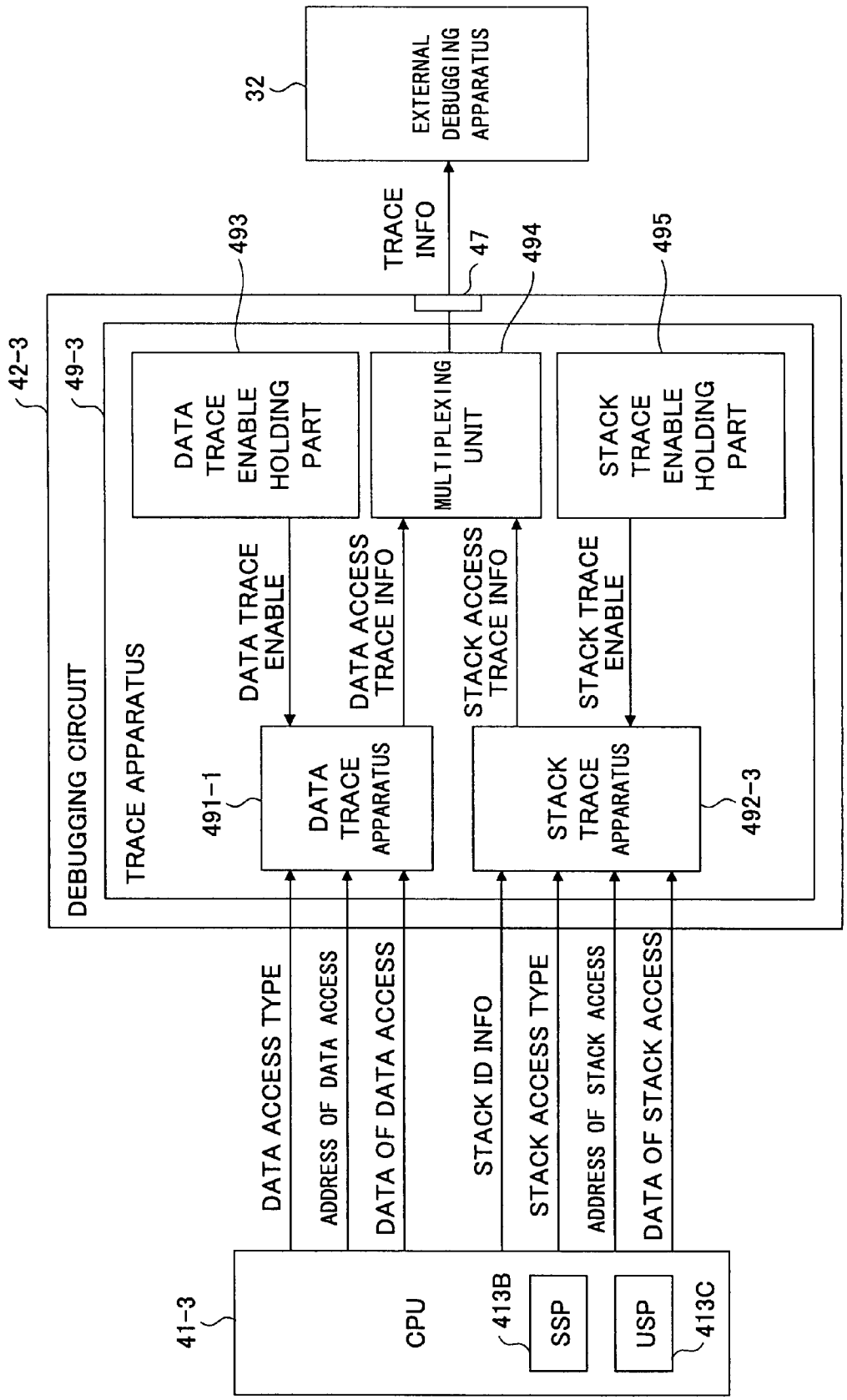
FIG. 16 is a system block diagram showing a debugging system of a third embodiment.
Figure 17:
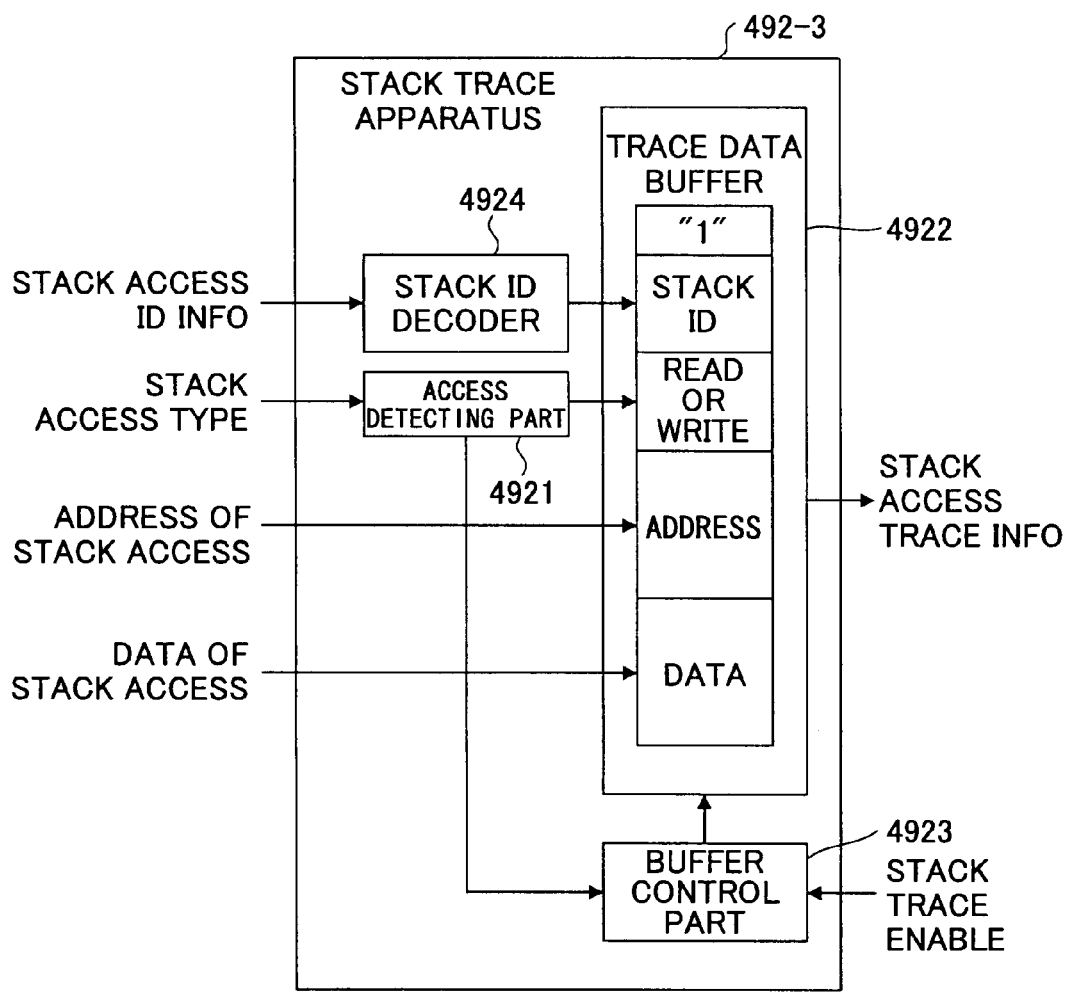
FIG. 17 is a system block diagram showing a structure of a stack trace apparatus of the third embodiment.

Next, a description will be given of a third embodiment of the present invention. This third embodiment has the first feature of the present invention described above. FIG. 16 is a system block diagram showing a debugging system of this third embodiment, and FIG. 17 is a system block diagram showing a structure of a stack trace apparatus of this third embodiment. In FIG. 16, those parts that are the same as those corresponding parts in FIG. 9 are designated by the same reference numerals, and a description thereof will be omitted. In FIG. 17, those parts that are the same as those corresponding parts in FIG. 15 are designated by the same reference numerals, and a description thereof will be omitted. In this third embodiment, a CPU 41-3 has a plurality of stack pointers (SPs).

A description will be given of the differences between this third embodiment and the first embodiment described above. In the first embodiment, the CPU 41-1 has one SP 413A as shown in FIG. 9. On the other hand, in this third embodiment, the CPU 41-3 has two SPs, namely, a user SP (USP) 413B and a system SP (SSP) 413C as shown in FIG. 16. In addition, in this third embodiment, as information for identifying which one of the plurality of SPs 413B and 413C is the SP for which the stack access is made, the CPU 41-3 generates the stack ID information together with information of other stack accesses. A debugging circuit 42-3 includes this stack ID information in the trace information of the stack access, and outputs the trace information to the external debugging apparatus 32 via the multiplexing unit 494 within a trace apparatus 49-3. The trace information including the stack ID information is stored in the storage unit of the external debugging apparatus 32.

A stack trace apparatus 492-3 has an access detecting part 4921, a trace data buffer 4922, a buffer control part 4923, and a stack ID decoder 4924 that are connected as shown in FIG. 17. The trace data, including a stack ID for the trace information obtained by decoding the stack access ID information by the stack ID decoder 4924, and having a trace information format shown in FIG. 18B, is stored in and read from the trace data buffer 4922 in response to an access detection made by the access detecting part 4921, under the control of the buffer control part 4923. The stack trace apparatus 492-3 generates the trace information of the stack access when the tracing of the stack access by the stack trace apparatus 492-3 is enabled by the stack trace enable held in the holding part 495 and the stack access signal is "1" which indicates that the data access is a stack access. The subsequent processes including that of the multiplexing unit 494 within the trace apparatus 49-3 are the same as those of the first embodiment described above.

FIGS. 18A through 18C are diagrams for explaining the trace information format and the data trace ID of this third embodiment. In FIGS. 18A through 18C, a description of those parts that are the same as those corresponding parts in FIGS. 11A through 11C will be omitted. The trace information format shown in FIGS. 18A through 18C differs from that shown in FIGS. 11A through 11C, in that the trace information format of this third embodiment includes the stack ID. Otherwise, the trace information format shown in FIGS. 18A through 18C is basically the same as that shown in FIGS. 11A through 11C. The stack ID indicates the information for identifying which one of the plurality of SPs 413B and 413C is the SP for which the stack access is made, when the CPU 41-3 has the plurality of SPs 413B and 413C. In the case of the CPU 41-3 having two SPs, namely, the SSP 413B and USP 413C, the stack ID may be assigned as shown in FIG. 18C, so that the debugger software may built a trace list of the tracing USP 413C and the stack access of the USP 413C and build a trace list of the tracing SSP 413B and the stack access of the SSP 413B.

Fourth Embodiment

Figure 19:
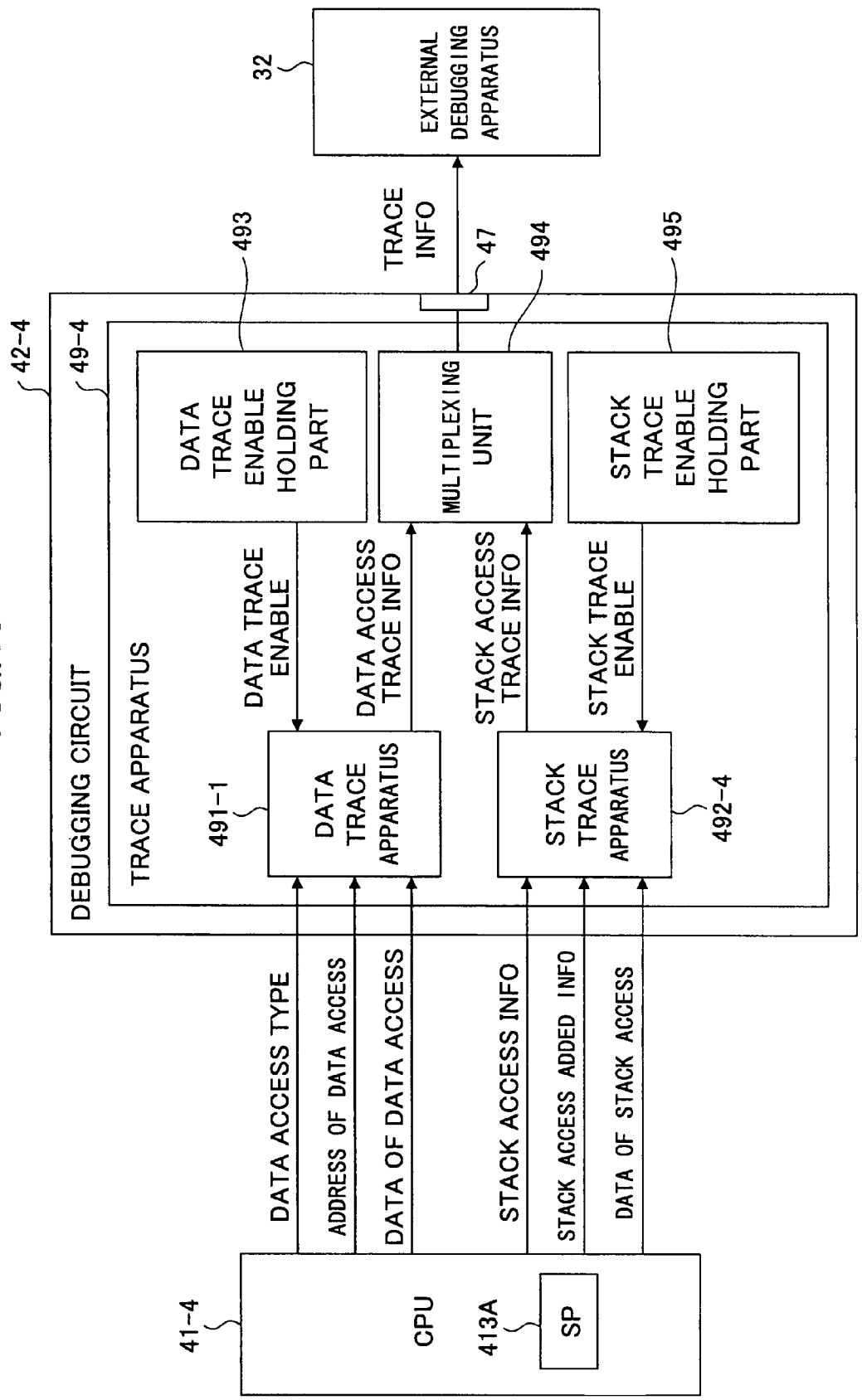
FIG. 19 is a system block diagram showing a debugging system of a fourth embodiment.
Figure 20:
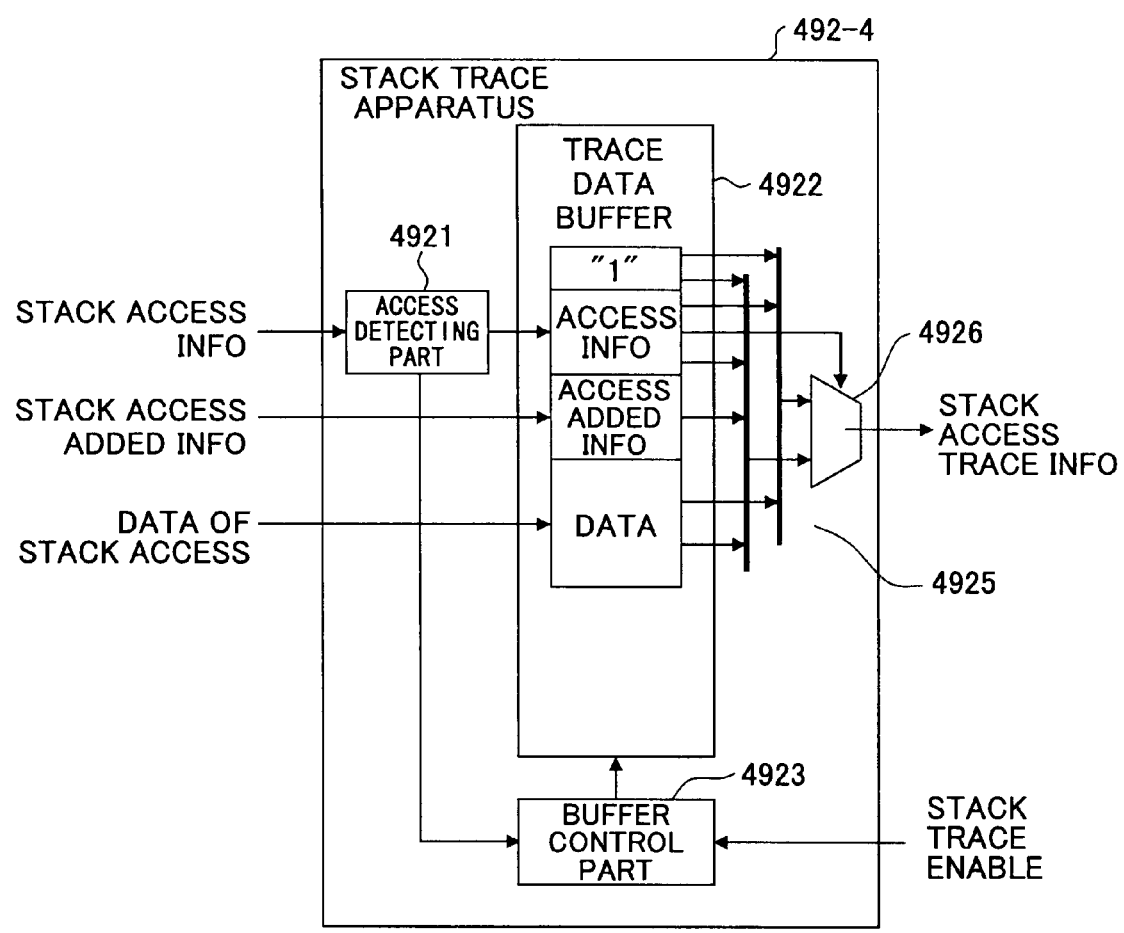
FIG. 20 is a system block diagram showing a structure of a stack trace apparatus of the fourth embodiment.

Next, a description will be given of a fourth embodiment of the present invention. This fourth embodiment has the second feature of the present invention described above. FIG. 19 is a system block diagram showing a debugging system of this fourth embodiment, and FIG. 20 is a system block diagram showing a structure of a stack trace apparatus of this fourth embodiment. In FIG. 19, those parts that are the same as those corresponding parts in FIG. 9 are designated by the same reference numerals, and a description thereof will be omitted. In addition, in FIG. 20, those parts that are the same as those corresponding parts in FIG. 15 are designated by the same reference numerals, and a description thereof will be omitted.

A description will be given of the differences between this fourth embodiment and the first embodiment described above. In the first embodiment, the CPU 41-1 generates exclusively for the stack access the stack access type (read or write information), the address of the stack access and the data of the stack access, with respect to the stack access executed by the CPU 41-1. On the other hand, in this fourth embodiment, a CPU 41-4 generates exclusively for the stack access the stack access information (two kinds of information including the stack access information and stack access added information) and the stack access data, with respect to the stack access executed by the CPU 41-4. A stack trace apparatus 492-4 of a trace apparatus 49-4 within a debugging circuit 42-4 monitors the stack access information generated by the CPU 41-4 and generates the trace information of the stack access when the tracing of the stack access by the stack trace apparatus 492-4 is enabled by the stack trace enable held in the holding part 495. The trace information of the stack access generated by the stack trace apparatus 492-4 is output to the external debugging apparatus 32, as the trace information, via the multiplexing unit 494 and the dedicated debugging pins 47, similarly to the first embodiment described above.

The stack trace apparatus 492-4 has an access detecting part 4921, a trace data buffer 4922, a buffer control part 4923, a multiplexer part 4925, and a selector part 4926 that are connected as shown in FIG. 20. The trace data is stored in and read from the trace data buffer 4922 in response to an access detection made by the access detecting part 4921, under the control of the buffer control part 4923. The trace data read from the trace data buffer 4922 is multiplexed in the multiplexer part 4925, to thereby output from the selector part 4926 the trace information of a type-1 trace information format including no stack access added information as shown in FIG. 21A or, the trace information of a type-2 trace information format including the stack access added information as shown in FIG. 21B. Whether to selectively output the type-1 trace information or the type-2 trace information from the selector part 4926 is controlled based on the stack access information. The stack trace apparatus 492-4 generates the trace information of the stack access when the tracing of the stack access by the stack trace apparatus 492-4 is enabled by the stack trace enable held in the holding part 495 and the stack access signal is "1" which indicates that the data access is a stack access. The subsequent processes including that of the multiplexing unit 494 within the trace apparatus 49-4 are the same as those of the first embodiment described above.

FIGS. 21A through 21D are diagrams for explaining the trace information format, the stack access information and the stack access added information of this fourth embodiment. The trace information format includes the type-1 trace information format shown in FIG. 21A that is used at the time of the PUSH access, POP access and SP rewrite, and the type-2 trace information format shown in FIG. 21B that is used at the time of the SP relative access. The type-1 and type-2 trace information formats include the data trace ID, the stack access information and the stack access data, and the type-2 trace information format additionally includes the stack access added information. The data trace ID is as described above in conjunction with the first feature of the present invention. The stack access information indicates the type (PUSH access, POP access, SP relative access or SP rewrite) of the executed stack access, and as shown in FIG. 21C, the stack access data indicates the data related to the stack access (access data at the time of the PUSH access, POP access or SP relative access, and new SP value at the time of the SP rewrite). The stack access added information indicates the additional access information at the time of the SP relative access. More particularly, as shown in FIG. 21D, the stack access added information indicates the read or write at the time of the SP relative access, and the offset value with respect to the SP value.

Next, a description will be given of the trace data obtained when each stack access is traced with the trace information format of the stack access, the SP (tracing SP) that is restored from the trace data by the debugger software, and the building of the trace list of the stack access.

FIGS. 22A through 22D are diagrams for explaining the trace data at the time of the SP rewrite, the tracing SP traced from the trace data, and the building of the trace list. FIG. 22A shows the trace data of the stack access, FIG. 22B shows the tracing SP (prior to reflecting the trace data), FIG. 22C shows the tracing SP (after reflecting the trace data), and FIG. 22D shows the building of the trace list of the stack access. The stack access information "0b11" indicates the SP rewrite, and the stack access data "0x000040000" indicates a new SP value. Hence, the value in the stack access data is overwritten on the tracing SP regardless of the value of the tracing SP prior to reflecting the trace data. At the time of the SP rewrite, no event of the stack access is generated, and thus, no event is recorded in the trace list of the stack access.

FIGS. 23A through 23D are diagrams for explaining the trace data at the time of a PUSH access, the tracing SP traced from the trace data, and the building of the trace list. FIG. 23A shows the trace data of the stack access, FIG. 23B shows the tracing SP (prior to reflecting the trace data), FIG. 23C shows the tracing SP (after reflecting the trace data), and FIG. 23D shows the building of the trace list of the stack access. The stack access information "0b00" indicates the PUSH access, and the stack access data "0x01234567" indicates the pushed data value. By the PUSH access, the tracing SP changes from the value "0x00004000" prior to reflecting the trace data to a value "0x00003FFC" by decrementing the address by the amount of the data width pushed. The access address by the PUSH access is "0x00003FFC". In other words, as a stack access, the data "0x01234567" is written to the address "0x00003FFC". Accordingly, an event "write data 0x01234567 to address 0x00003FFC" is recorded in the trace list.

FIGS. 24A through 24D are diagrams for explaining the trace data at the time of a POP access, the tracing SP traced from the trace data, and the building of the trace list. FIG. 24A shows the trace data of the stack access, FIG. 24B shows the tracing SP (prior to reflecting the trace data), FIG. 24C shows the tracing SP (after reflecting the trace data), and FIG. 24D shows the building of the trace list of the stack access. The stack access information "0b01" indicates the POP access, and the stack access data "0x89ABCDEF" indicates the popped data value. The access address by the POP access is "0x00003FF0". In other words, as a stack access, the data "0x89ABCDEF" is read from the address "0x00003FF0". Accordingly, an event "read data 0x89ABCDEF from address 0x00003FF0" is recorded in the trace list. By the POP access, the tracing SP changes from the value "0x00003FF0" prior to reflecting the trace data to a value "0x00003FF4" by incrementing the address by the amount of the data width popped.

FIGS. 25A through 25D are diagrams for explaining the trace data at the time of an SP relative access, the tracing SP traced from the trace data, and the building of the trace list. FIG. 25A shows the trace data of the stack access, FIG. 25B shows the tracing SP (prior to reflecting the race data), FIG. 25C shows the tracing SP (after reflecting the trace data), and FIG. 25D shows the building of the trace list of the stack access. The stack access information "0b10" indicates the SP relative access. The stack access added information is "0x14", and "0b1" of bit 4 indicates the write access, and "0x4" of bits 3-0 indicates that the offset value with respect to the SP value is "+0x01" (where 0x4 indicates the upper 4 bits of the 6-bit offset value). The stack access data "0xF0E1D2C3" indicates the data value of the SP relative access. Since the generation of the SP relative access does not affect the tracing SP, the tracing SP maintains the value "0x00003FC0" prior to reflecting the trace data. The access address of the SP relative access is "0x00003FD0", from the SP value "0x00003FC0" and the offset value "+0x10". In addition, the SP relative access is a write access. In other words, as a stack access, the data "0xF0E1D2C3" is written to the address "0x00003FD0". Hence, an event "write data 0xF0E1D2C3 to address 0x00003FD0" is recorded in the trace list.

By the method described heretofore, the CPU 41-4 and the debugging circuit 42-4 can generate the trace information of the stack access based on the stack access information, and the debugger software can obtain the tracing SP and build the trace list of the stack access from the trace data.

The trace of this fourth embodiment was described for the case where the CPU 41-4 has a single SP 413A. However, the CPU may of course have a plurality of SPs, and in such a case, it is possible to easily cope with the plurality of SPs by adding the stack ID described above.

In addition, this fourth embodiment may not only be combined with the third embodiment described above, but may be appropriately combined with the first embodiment or the second embodiment described above.

According to the first feature of the present invention, the debugging system can independently trace the stack access and the normal data access. As a result, the debugging system can omit the processes of analyzing the trace information in which the stack access and the normal data access coexist and separating the trace information of the stack access and the normal data access, to thereby enable the processes of the debugging system to be reduced. In addition, according to the first feature of the present invention, it is possible to selectively output the trace information of the stack access and the normal data access as the trace information. Hence, when obtaining the trace data of only one of the two data accesses, there is no need to generate the trace data of the other of the two data access that does not need to be traced, and the generation of the unnecessary trace data is prevented. Accordingly, it is unnecessary to increase the limited bandwidth of the dedicated debugging pins and the storage capacity of the storage unit that stores the trace data, which would otherwise be required if the unnecessary trace data were generated. In other words, it is possible to effectively reduce the load on the resources of the debugging system. Therefore, under a condition that the resources of the debugging system are the same as those of the conventional debugging system, it is possible to increase the speed of the data trace process. Furthermore, for the same data trace process, it is possible to reduce the required resources of the debugging system when carrying out when compared to the conventional debugging system.

According to the second feature of the present invention, with respect to the trace information of the stack access, it is possible to carry out an information compression that takes into consideration the locality and the continuity of the address of the stack access. More particularly, not the address of the stack access but the stack access information is used for the trace information of the stack access. In addition, the access address with respect to the SP and the updating of the SP are represented by relative values at the time of the stack access, and the new SP value is represented by the absolute value at the time of the SP rewrite. By employing such a representation method, it becomes unnecessary to include the address information of the stack access in the trace information of the stack access. As a result, the amount of trace information of the stack access can be reduced, and the load on the bandwidth of the dedicated debugging pins can be reduced. Moreover, since the SP is restored at the stage where the trace list is built, there is an advantage in that the SP can be traced simultaneously. According to the second feature of the present invention, the information related to the SP rewrite, which is unnecessary in the conventional debugging system, is generated as the trace information, and the tracing target is increased thereby. However, the SP rewrite is not carried out many times during execution of the program, and substantially no undesirable effects are introduced by the increase in the tracing target caused by the tracing of the SP rewrite. In other words, it may be regarded that the undesirable effects caused by the increased amount of trace information is sufficiently small compared to the advantageous effects obtained by the compression of the trace information.

Next, a description will be given of a simple estimate of the compression efficiency of the trace information of the stack access in the fourth embodiment having the second feature of the present invention. It is assumed for the sake of convenience that the uncompressed trace information not using the second feature of the present invention has the format shown in FIG. 11B, and the compressed trace information using the second feature of the present invention has the format shown in FIGS. 21A and 21B. In this case, the address information is made up of 32 bits, the read or write information is made up of 1 bit, and the data information is made up of 32 bits for the uncompressed trace information. On the other hand, in the case of the compressed trace information, the access information is made up of 2 bits in the case of the PUSH access, POP access or SP rewrite, and is made up of 7 bits in the case of the SP relative access, and the data information is made up of 32 bits. Therefore, the information compression rate excluding the data information is approximately $\frac{1}{16}$ in the case of the PUSH access, POP access or SP rewrite, and is approximately $\frac{1}{5}$ in the case of the SP relative access. The compression rate with respect to all of the information is approximately $\frac{1}{2}$ in the case of the PUSH access, POP access or SP rewrite, and is approximately $\frac{3}{5}$ in the case of the SP relative access.

This application claims the benefit of a Japanese Patent Application No. 2006-240079 filed Sep. 5, 2006, in the Japanese Patent Office, the disclosure of which is hereby incorporated by reference.

Further, the present invention is not limited to these embodiments, but various variations and modifications may be made without departing from the scope of the present invention.

What is claimed is:

1. A debugging system comprising a CPU that is a debugging target and a debugging circuit, wherein:
    the CPU comprises an output part configured to provide data access information in a manner indicative of whether a given amount of data access information represents a stack access or a normal data access, such that the output part is operative to independently output stack access information and normal data access information, the latter representing data access information except for the stack access information, as data access information to the debugging circuit; and
    the debugging circuit comprises a trace part configured to independently generate and output trace information corresponding to the stack access information received from the CPU and trace information corresponding to the normal data access information received from the CPU.

2. The debugging system as claimed in claim 1, wherein:
the output part is further operative to include, in the data access information, information of the data access and a signal indicating whether or not the data access is a stack access; and
the trace part independently generates and outputs the trace information corresponding to the stack access information and the trace information corresponding to the normal data access information based upon the signal.

3. The debugging system as claimed in claim 1, wherein the trace part comprises:
a part configured to independently enable generation of the trace information corresponding to the stack access information and the generation of the trace information corresponding to the normal data access information; and
a part configured to multiplex the trace information corresponding to the stack access information and the trace information corresponding to the normal data access information,
whereby the trace information corresponding to the stack access information and the trace information corresponding to the normal data access information are selectively traced.

4. The debugging system as claimed in claim 1, further comprising:
an external debugging apparatus configured to independently trace the stack access information and the normal data access information, from the trace information corresponding to the stack access information and the trace information corresponding to the normal data access information that are output from the debugging circuit.

5. The debugging system as claimed in claim 4, wherein:
the output part includes in the stack access information, information related to a stack access type, the data of the stack access and an offset value from a stack pointer when the stack access is executed, and information related to execution of a stack pointer rewrite and a new stack pointer value when the stack pointer rewrite is executed;
the trace part generates and outputs, based on the stack access information received from the CPU, trace information including the information related to the stack access type, the data of the stack access and the offset value from the stack pointer when the stack access is executed, and trace information including the information related to the execution of the stack pointer rewrite and the new stack pointer value when the stack pointer rewrite is executed; and
the external debugging apparatus traces the stack pointer from the trace information of the stack access output from the debugging circuit.

6. The debugging system as claimed in claim 4, wherein the external debugging apparatus traces the stack access information from the trace information of the stack access output from the trace part.

7. The debugging system as claimed in claim 5, wherein:
the output part includes in the stack access information, information related to a stack push access that is generated and data of the stack push access when the CPU executes the stack push access;
the trace part generates and outputs trace information of the stack access including the information related to the stack push access that is generated and the data of the stack push access from the stack access information that is output from the CPU; and
of the trace information of the stack access that is output from the debugging circuit, the external debugging apparatus traces a decrement of the stack pointer based on the information indicating that the generated stack access is the stack push access, and traces a write access to an address indicated by the stack pointer and write data thereof based on the information indicating that the generated stack access is the stack push access and information related to the data of the generated stack access.

8. The debugging system as claimed in claim 5, wherein:
the output part includes in the stack access information, information related to a stack pop access that is generated and data of the stack pop access when the CPU executes the stack pop access;
the trace part generates and outputs trace information of the stack access including the information related to the stack pop access that is generated and the data of the stack pop access from the stack access information that is output from the CPU; and
of the trace information of the stack access that is output from the debugging circuit, the external debugging apparatus traces a read access to an address indicated by the stack pointer and read data thereof based on the information indicating that the generated stack access is the stack pop access and information related to the data of the generated stack access, and traces an increment of the stack pointer based on the information indicating that the generated stack access is the stack pop access.

9. The debugging system as claimed in claim 5, wherein:
the output part includes in the stack access information, information related to a stack pointer relative access that is generated, read or write of the access, a relative address value from the stack pointer, and data of the stack pointer relative access when the CPU executes the stack pointer relative access;
the trace part generates and outputs trace information of the stack access including the information related to the stack pointer relative access that is generated, the read or write of the access, the relative address value from the stack pointer, and the data of the stack pointer relative access from the stack access information that is output from the CPU; and
the external debugging apparatus traces a read access and read data thereof or, a write access and write thereof, to an address indicated by a sum of the stack pointer and an offset value from the stack pointer and read data thereof, based on the information included in the trace information of the stack access that is output from the debugging circuit.

10. The debugging system as claimed in claim 5, wherein:
the output part includes in the stack access information, information related to a stack pointer rewrite that is generated and a new stack pointer value caused thereby when the CPU executes the stack pointer rewrite;
the trace part generates and outputs trace information of the stack access including the information related to the stack pointer rewrite that is generated and the new stack pointer value caused thereby from the stack access information that is output from the CPU; and
the external debugging apparatus traces the stack pointer rewrite and the new stack pointer value caused thereby, based on the information included in the trace information of the stack access that is output from the debugging circuit.

11. A debugging circuit for debugging a CPU that independently outputs stack access information of a stack access and normal data access information representing data access information except for the stack access information, as data access information, comprising:
   a stack trace part configured to generate and output trace information of the stack access from the stack access information that is output from the CPU; and
   a data trace part configured to generate and output trace information of the normal data access from the normal data access information representing data access information except for the stack access information that is output from the CPU, independently of the stack trace part that generates and outputs the trace information of the stack access.

12. The debugging circuit as claimed in claim 11, wherein:
   the data access information that is output from the CPU includes information of the data access and a signal indicating whether or not the data access is a stack access; and
   the stack trace part and the data trace part independently generate and output the trace information of the stack access and the trace information of the normal data access based upon the signal.

13. The debugging circuit as claimed in claim 11, wherein the trace part comprises:
   a part configured to independently enable generation of the trace information of the stack access by the stack trace part and the generation of the trace information of the normal data access by the data trace part; and
   a part configured to multiplex the trace information of the stack access output from the stack trace part and the trace information of the normal data access output from the data trace part,
   whereby the trace information of the stack access and the trace information of the normal data access are selectively traced.

14. The debugging circuit as claimed in claim 11, wherein:
   the stack access information that is output from the CPU includes information related to a stack access type, the data of the stack access and an offset value from a stack pointer when the stack access is executed, and information related to execution of a stack pointer rewrite and a new stack pointer value when the stack pointer rewrite is executed; and
   the stack trace part generates and outputs, based on the stack access information that is output from the CPU, trace information including the information related to the stack access type, the data of the stack access and the offset value from the stack pointer when the stack access is executed, and trace information including the information related to the execution of the stack pointer rewrite and the new stack pointer value when the stack pointer rewrite is executed.

15. An information processing apparatus that is monitored by a debugging circuit, comprising:
   a memory access control part configured to generate a memory access, and an access signal indicating whether or not the memory access is a stack access; and
   an output part configured to independently output stack access information of the stack access and normal data access information representing data access information except for the stack access information, as data access information of the information processing apparatus, in response to the access signal.

16. The information processing apparatus as claimed in claim 15, wherein the output part includes, in the data access information that is output, information of the data access and a signal indicating whether or not the data access is a stack access.

17. The information processing apparatus as claimed in claim 15, wherein the output part includes, in the stack access information that is output, information related to a stack access type, the data of the stack access and an offset value from a stack pointer when the stack access is executed, and information related to execution of a stack pointer rewrite and a new stack pointer value when the stack pointer rewrite is executed.

18. The information processing apparatus as claimed in claim 15, wherein the output part includes, in the stack access information that is output, information related to a stack push access that is generated and data of the stack push access when the stack push access is executed.

19. The information processing apparatus as claimed in claim 15, wherein the output part includes, in the stack access information that is output, information related to a stack pointer relative access that is generated, read or write of the access, a relative address value from the stack pointer, and data of the stack pointer relative access when the stack pop access is executed.

20. The information processing apparatus as claimed in claim 15, wherein the output part includes, in the stack access information that is output, information related to a stack pointer rewrite that is generated and a new stack pointer value caused thereby when the stack pointer rewrite is executed.

* * * * *